United States Patent
Hirakata et al.

(10) Patent No.: US 9,981,457 B2
(45) Date of Patent: May 29, 2018

(54) MANUFACTURING APPARATUS OF STACK

(71) Applicant: SEMICONDUCTOR ENERGY LABORATORY CO., LTD., Atsugi-shi, Kanagawa-ken (JP)

(72) Inventors: Yoshiharu Hirakata, Kanagawa (JP); Satoshi Seo, Kanagawa (JP)

(73) Assignee: Semiconductor Emergy Laboratory Co., Ltd., Atsug-shi, Kanagaway-ken ( * ) Notice: Subject to any disclaimer, the term of this patent is extended or adjusted under 35 U.S.C. 154(b) by 381 days.

(21) Appl. No.: 14/484,802

(22) Filed: Sep. 12, 2014

(65) Prior Publication Data
US 2015/0075720 A1 Mar. 19, 2015

(30) Foreign Application Priority Data

Sep. 18, 2013 (JP) .................. 2013-193314

(51) Int. Cl.
*B32B 37/00* (2006.01)
*B32B 37/02* (2006.01)
(Continued)

(52) U.S. Cl.
CPC .............. *B32B 37/02* (2013.01); *B32B 37/12* (2013.01); *B32B 37/22* (2013.01);
(Continued)

(58) Field of Classification Search
CPC ......... Y10T 156/1089; Y10T 156/1092; Y10T 156/1097; Y10T 156/1961;
(Continued)

(56) References Cited

U.S. PATENT DOCUMENTS 4,927,491 A * 5/1990 Masaki ............... G02F 1/13452
216/18
5,266,116 A 11/1993 Fujioka et al.
(Continued)

FOREIGN PATENT DOCUMENTS

| JP | 11204548 A | * | 7/1999 |
| JP | 2001274179 A | * | 10/2001 |
| JP | 2003-174153 A | | 6/2003 |

OTHER PUBLICATIONS

Machine translation of JP 11-204548 date unknown.*
(Continued)

*Primary Examiner* — John Goff
(74) *Attorney, Agent, or Firm* — Fish & Richardson P.C.

(57) ABSTRACT

The stack manufacturing apparatus includes a first supporting body supply unit which is configured to intermittently unroll a roll sheet-shaped first supporting body and includes one of a pair of tension applying devices capable of applying tension to the unrolled first supporting body; a first adhesive layer formation unit configured to form a first adhesive layer over the first supporting body while the first supporting body supply unit suspends unrolling of the first supporting body; a first bonding unit configured to bond the first supporting body and a sheet-shaped member using the first adhesive layer; and a control unit which is configured to hold an end portion of the first supporting body and includes the other of the pair of tension applying devices.

25 Claims, 17 Drawing Sheets

(51) Int. Cl.
  *B32B 37/12* (2006.01)
  *B32B 38/18* (2006.01)
  *B32B 38/00* (2006.01)
  *B32B 37/22* (2006.01)
(52) U.S. Cl.
  CPC ....... *B32B 38/0004* (2013.01); *B32B 38/1858* (2013.01); *B32B 38/1875* (2013.01); *B32B 2038/0076* (2013.01); *B32B 2309/62* (2013.01); *B32B 2309/68* (2013.01); *B32B 2457/14* (2013.01)
(58) Field of Classification Search
  CPC ......... Y10T 156/1967; Y10T 156/1978; Y10T 156/1983; Y10T 156/1989; H01L 21/67132; B32B 38/10; B32B 37/02; B32B 37/22; B29C 66/0224
  USPC .......................... 156/297, 302, 382; 438/118
  See application file for complete search history.

(56) References Cited

U.S. PATENT DOCUMENTS

| | | | |
|---|---|---|---|
| 5,296,036 A | 3/1994 | Matsuyama et al. | |
| 5,457,299 A * | 10/1995 | Blais | B29C 35/08 219/121.6 |
| 5,468,521 A | 11/1995 | Kanai et al. | |
| 5,652,029 A | 7/1997 | Itoh | |
| 5,736,431 A | 4/1998 | Shinohara et al. | |
| 5,791,549 A * | 8/1998 | Ito | B23K 20/10 228/1.1 |
| 5,929,961 A | 7/1999 | Nishi et al. | |
| 6,171,674 B1 | 1/2001 | Yamazaki et al. | |
| 6,268,235 B1 | 7/2001 | Sakakura et al. | |
| 6,273,955 B1 | 8/2001 | Yoshino et al. | |
| 6,620,288 B2 | 9/2003 | Shinohara et al. | |
| 6,885,146 B2 | 4/2005 | Yamazaki et al. | |
| 7,176,069 B2 | 2/2007 | Yamazaki et al. | |
| 7,554,121 B2 | 6/2009 | Hirakata et al. | |
| 7,591,863 B2 | 9/2009 | Watanabe et al. | |
| 7,666,766 B2 | 2/2010 | Hiura et al. | |
| 8,040,469 B2 | 10/2011 | Nakamura et al. | |
| 8,048,777 B2 | 11/2011 | Eguchi et al. | |
| 8,123,896 B2 | 2/2012 | Watanabe et al. | |
| 8,137,417 B2 | 3/2012 | Eguchi et al. | |
| 8,415,208 B2 | 4/2013 | Takayama et al. | |
| 2001/0023971 A1 | 9/2001 | Kondo et al. | |
| 2003/0009876 A1 * | 1/2003 | Yamauchi | H01L 21/563 29/832 |
| 2003/0235939 A1 * | 12/2003 | Takemura | H01L 21/67132 438/118 |
| 2007/0183184 A1 | 8/2007 | Nakamura et al. | |
| 2008/0042168 A1 | 2/2008 | Watanabe et al. | |
| 2009/0142903 A1 * | 6/2009 | Yu | H01L 21/67051 438/455 |
| 2013/0134051 A1 | 5/2013 | Takahashi et al. | |

OTHER PUBLICATIONS

Machine translation of JP 2001-274179 (date unknown).*
S.-Y. Ie, "P-102: Audible OLED Device on Flexible PVDF Substrate with Laser Patterned ITO Electrode", SID Digest '08 : SID International Symposium Digest of Technical Papers, May 20, 2008, vol. 39, pp. 1575-1578.

* cited by examiner

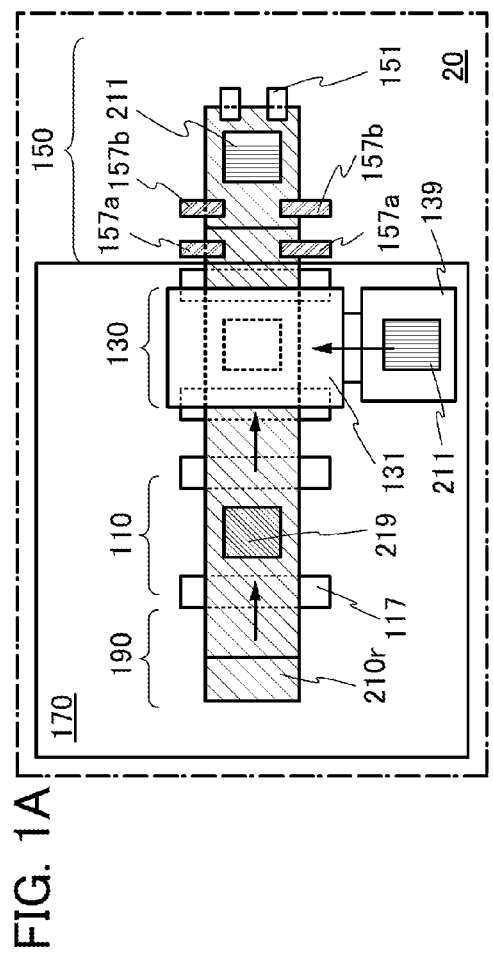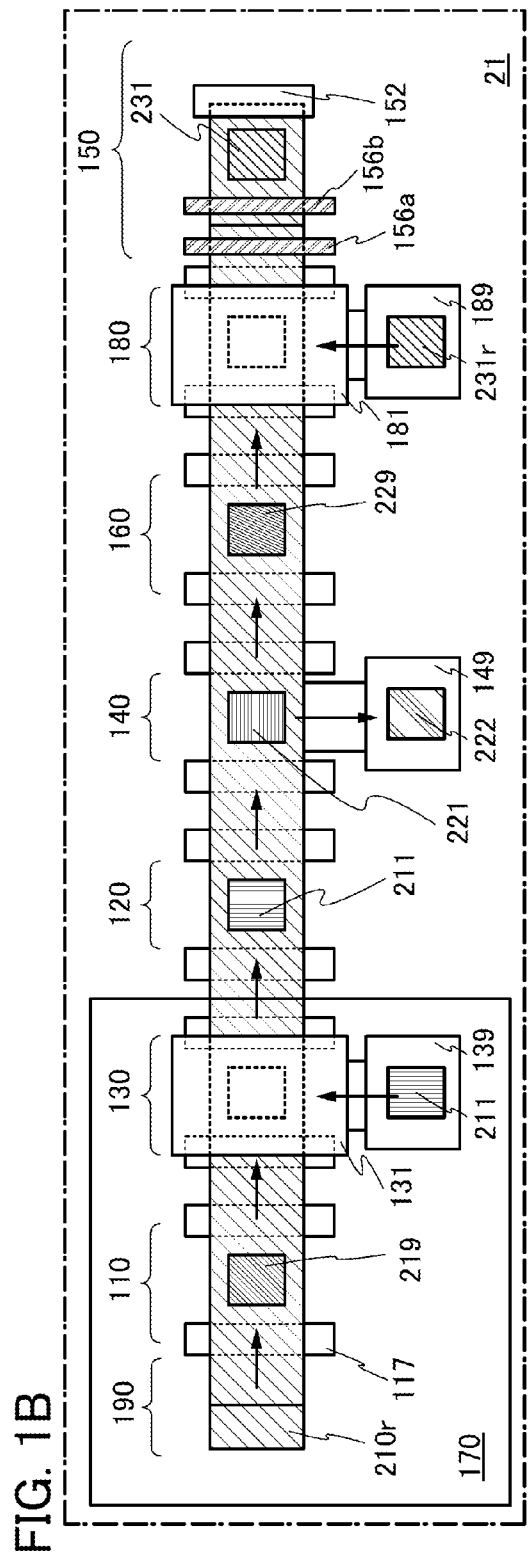

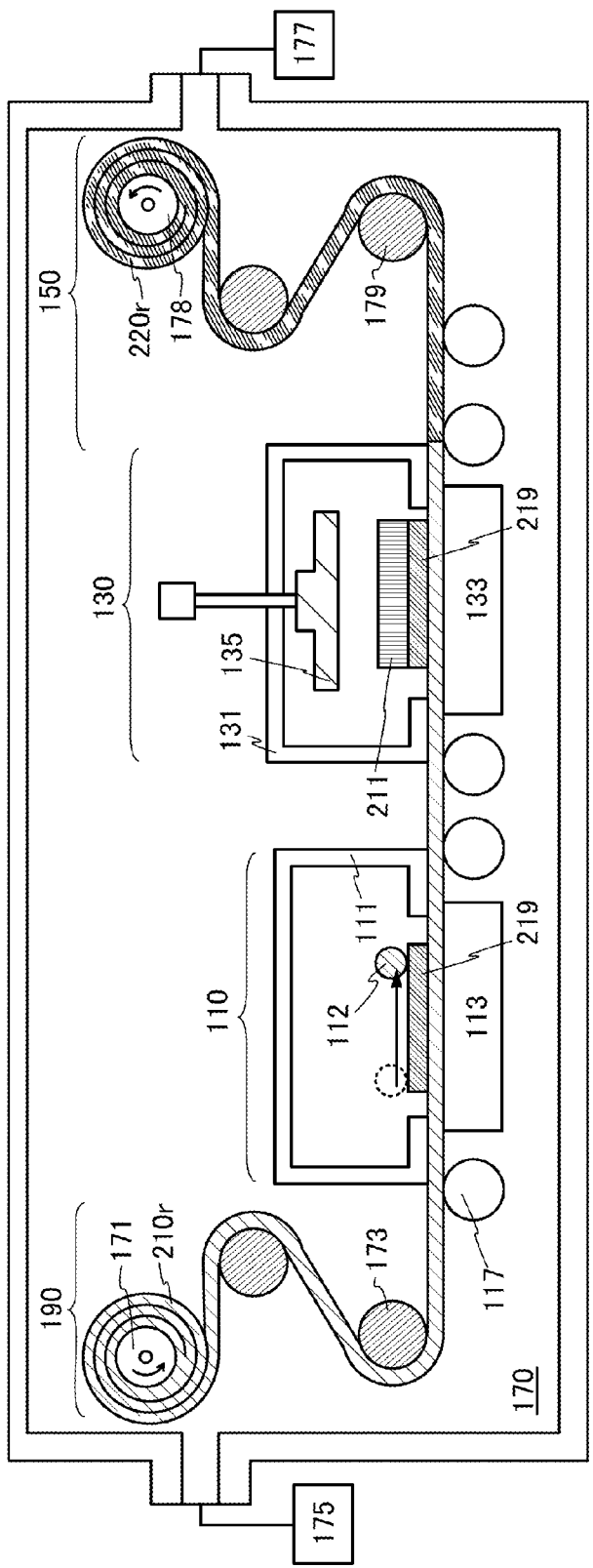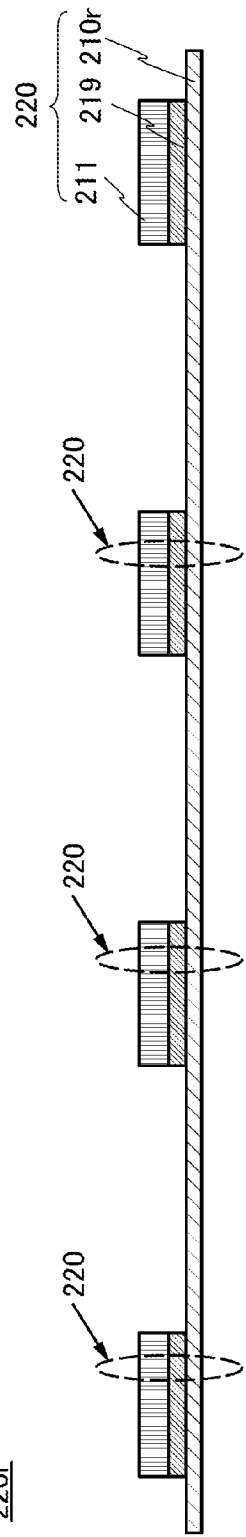

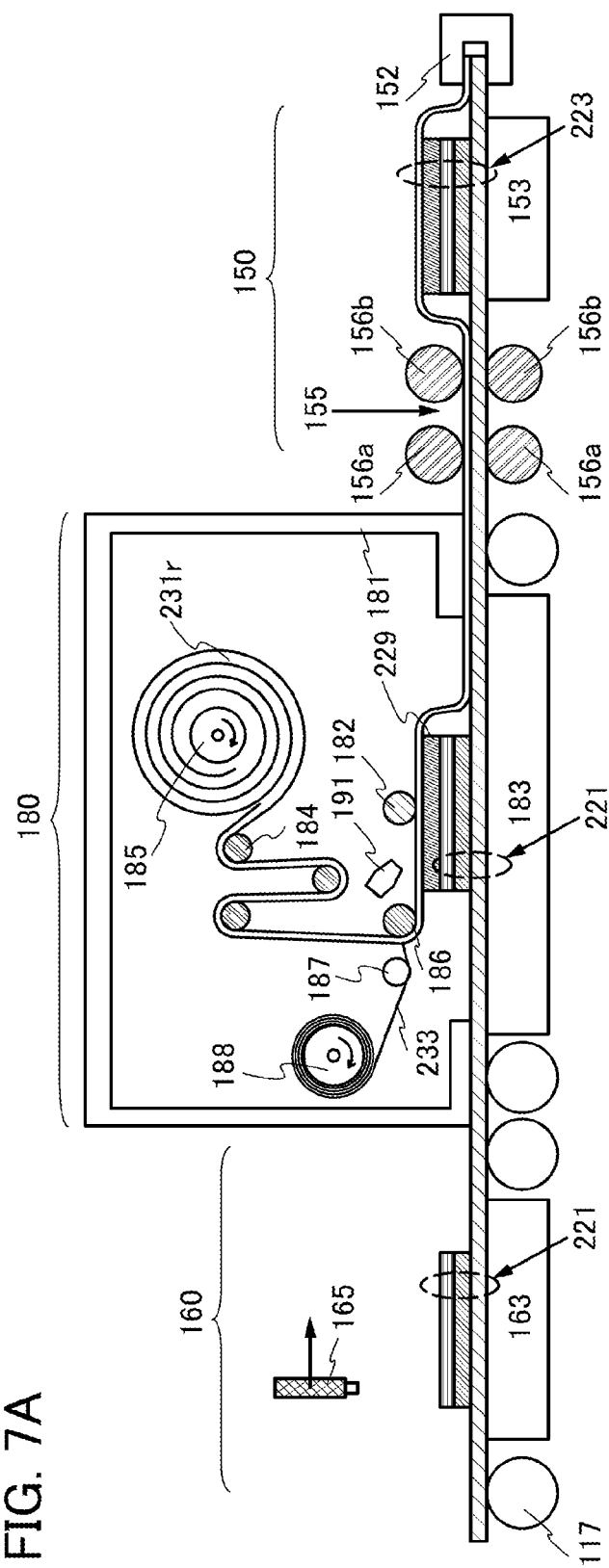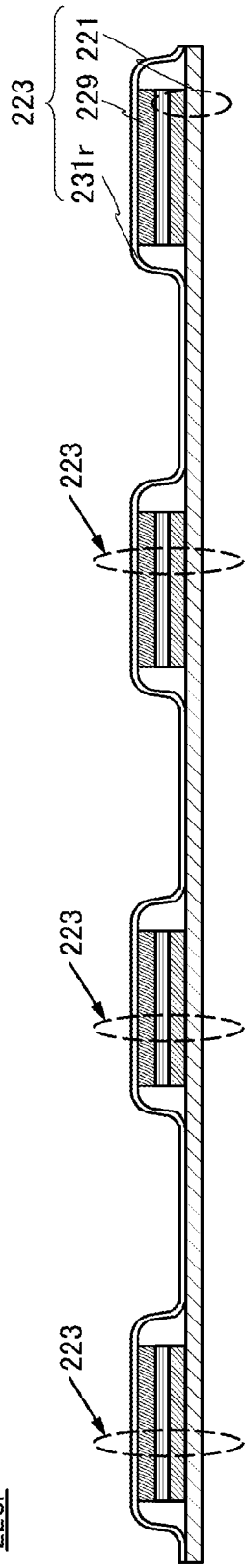

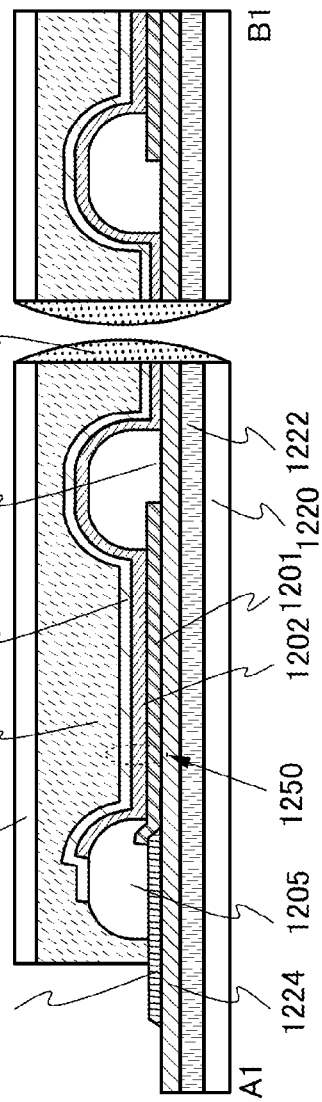
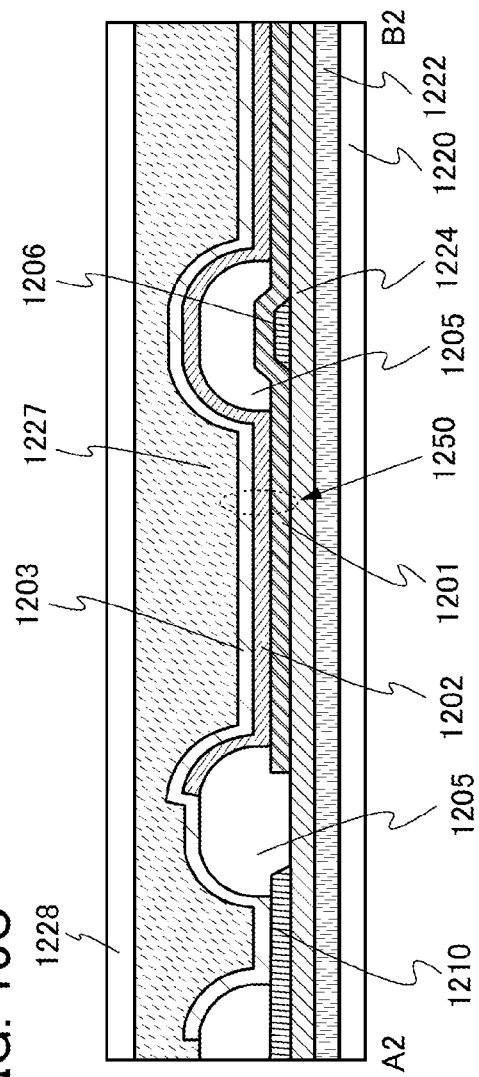
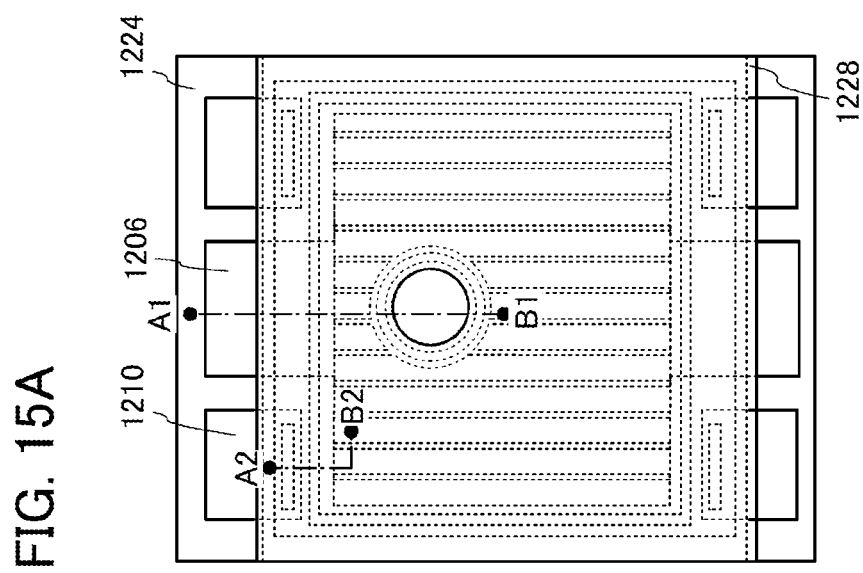

MANUFACTURING APPARATUS OF STACK

BACKGROUND OF THE INVENTION

1. Field of the Invention

The present invention relates to an object, a method, or a manufacturing method. The present invention relates to a process, a machine, manufacture, or a composition of matter. One embodiment of the present invention relates to a semiconductor device, a display device, a light-emitting device, a lighting device, a driving method thereof, a manufacturing method thereof, or a manufacturing apparatus thereof. One embodiment of the present invention particularly relates to an apparatus for manufacturing a stack and a manufacturing method of a stack.

2. Description of the Related Art

In recent years, a flexible device in which a functional element such as a semiconductor element, a display element, or a light-emitting element is provided over a substrate having flexibility (hereinafter also referred to as a flexible substrate) has been developed. Typical examples of flexible devices include, as well as a lighting device and an image display device, a variety of semiconductor circuits each including a semiconductor element such as a transistor.

For example, light-emitting devices and display devices as mobile devices and the like are required to be thin, lightweight, and less likely to be broken.

Light-emitting elements utilizing electroluminescence (also referred to as EL elements) have features of the ease of being thinner and lighter, high speed response to input signals, and capability of DC low voltage driving and have been expected to be applied to light-emitting devices and display devices.

For example, Patent Document 1 discloses a flexible active matrix light-emitting device in which an organic EL element or a transistor serving as a switching element is provided over a film substrate.

REFERENCE

[Patent Document 1] Japanese Published Patent Application No. 2003-174153

SUMMARY OF THE INVENTION

A manufacturing apparatus for manufacturing such a flexible device are required. In addition, a manufacturing apparatus that is capable of mass-production of flexible devices and a manufacturing method that allows mass-production of flexible devices are required.

An object of one embodiment of the present invention is to provide a novel stack manufacturing apparatus. Another object of one embodiment of the present invention is to provide a stack manufacturing apparatus that enables large-scale production.

Another object of one embodiment of the present invention is to improve the yield in a manufacturing process of a device such as a semiconductor device, a light-emitting device, a display device, an electronic device, or a lighting device. In particular, another object of one embodiment of the present invention is to improve the yield in a manufacturing process of a device such as a semiconductor device, a light-emitting device, a display device, an electronic device, or a lighting device that is lightweight, thin, or flexible. Another object of one embodiment of the present invention is to provide a highly reliable light-emitting device. Another object of one embodiment of the present invention is to provide a novel light-emitting device or the like.

Note that the descriptions of these objects do not disturb the existence of other objects. Note that one embodiment of the present invention does not necessarily achieve all the objects. Other objects will be apparent from and can be derived from the descriptions of the specification, the drawings, the claims, and the like.

One embodiment of the present invention is a stack manufacturing apparatus including a first supporting body supply unit where a first supporting body can be intermittently unrolled and one of a pair of tension applying devices capable of applying tension to the unrolled first supporting body is provided; a first adhesive layer formation unit where the first supporting body that is unrolled is supplied and a first adhesive layer can be formed over the first supporting body that is stationary; a first bonding unit where the first supporting body over which the first adhesive layer is formed and a sheet-shaped member are supplied and the member can be bonded to the first supporting body that is stationary using the first adhesive layer so that a first stack where the first supporting body, the first adhesive layer, and the member are stacked in this order can be formed; and a control unit where an end portion of the first supporting body that is unrolled can be held and the other of the pair of tension applying devices is provided. That is, one embodiment of the present invention is an apparatus for manufacturing a stack including a first supporting body supply unit which includes a first tension applying device and is configured to intermittently unroll a first supporting body that is rolled; a first adhesive layer formation unit which is configured to be supplied with a region unrolled from the first supporting body and form a first adhesive layer over the region unrolled from the first supporting body while unrolling of the first supporting body is stopped; a first bonding unit which is configured to be supplied with the region unrolled from the first supporting body over which the first adhesive layer is formed and a sheet-shaped member and bond the member to the region unrolled from the first supporting body using the first adhesive layer so that a first stack where the region unrolled from the first supporting body, the first adhesive layer, and the member are stacked in this order is formed while unrolling of the first supporting body is stopped; and a control unit which includes a second tension applying device and is configured to hold an end portion of the region unrolled from the first supporting body. The first tension applying device and the second tension applying device are configured to apply tension to the region unrolled from the first supporting body.

The apparatus for manufacturing a stack that has the above structure may include a dividing unit which is configured to be supplied with the first stack and divide the first supporting body that is stationary. That is, the apparatus may include a dividing unit which is configured to divide the region unrolled from the first supporting body while unrolling of the first supporting body is stopped. Alternatively, the stack manufacturing apparatus that has the above structure may include a rolling-up unit which is configured to be supplied with the first stack and intermittently roll up the first stack. The dividing unit or the rolling-up unit may double as the control unit.

The stack manufacturing apparatus that has the above structure may include a first adhesive layer curing unit which is configured to be supplied with the first stack and cure the first adhesive layer.

Another embodiment of the present invention is a stack manufacturing apparatus including a first supporting body supply unit where a first supporting body can be intermittently unrolled and one of a pair of tension applying devices capable of applying tension to the unrolled first supporting body is provided; a first adhesive layer formation unit where the first supporting body that is unrolled is supplied and a first adhesive layer can be formed over the first supporting body that is stationary; a first bonding unit where the first supporting body over which the first adhesive layer is formed and a sheet-shaped member are supplied and the member can be bonded to the first supporting body that is stationary using the first adhesive layer so that a first stack where the first supporting body, the first adhesive layer, and the member are stacked in this order can be formed; a trigger formation unit where the first stack is supplied and a separation trigger can be formed in vicinities of end portions of the first adhesive layer and the member that are stationary; a separating unit where the first stack in which the separation trigger is formed is supplied and the first stack that is stationary can be separated into an outer layer and a remaining portion; a second adhesive layer formation unit where the remaining portion is supplied and a second adhesive layer can be formed over the remaining portion that is stationary; a second bonding unit where the remaining portion over which the second adhesive layer is formed and a sheet-shaped second supporting body are supplied and the second supporting body is bonded to the remaining portion that is stationary using the second adhesive layer so that a second stack where the remaining portion, the second adhesive layer, and the second supporting body are stacked in this order can be formed; and a control unit where an end portion of the first supporting body that is unrolled can be held. That is, another embodiment of the present invention is an apparatus for manufacturing a stack including a first supporting body supply unit which includes a first tension applying device and is configured to intermittently unroll a first supporting body that is rolled; a first adhesive layer formation unit which is configured to be supplied with a region unrolled from the first supporting body and form a first adhesive layer over the region unrolled from the first supporting body while unrolling of the first supporting body is stopped; a first bonding unit which is configured to be supplied with the region unrolled from the first supporting body over which the first adhesive layer is formed and a sheet-shaped member are supplied and bond the member to the region unrolled from the first supporting body using the first adhesive layer so that a first stack where the region unrolled from the first supporting body, the first adhesive layer, and the member are stacked in this order is formed while unrolling of the first supporting body is stopped; a trigger formation unit which is configured to be supplied with the first stack and form a separation trigger in vicinities of end portions of the first adhesive layer and the member while unrolling of the first supporting body is stopped; a separating unit which is configured to be supplied with the first stack in which the separation trigger is formed and separate the first stack into an outer layer and a remaining portion while unrolling of the first supporting body is stopped; a second adhesive layer formation unit which is configured to be supplied with the remaining portion and form a second adhesive layer over the remaining portion while unrolling of the first supporting body is stopped; a second bonding unit which is configured to be supplied with the remaining portion over which the second adhesive layer is formed and a sheet-shaped second supporting body and bond the second supporting body to the remaining portion using the second adhesive layer so that a second stack where the remaining portion, the second adhesive layer, and the second supporting body are stacked in this order is formed while unrolling of the first supporting body is stopped; and a control unit which includes a second tension applying device and is configured to hold an end portion of the region unrolled from the first supporting body. The first tension applying device and the second tension applying device are configured to apply tension to the region unrolled from the first supporting body.

The stack manufacturing apparatus that has the above structure may include a dividing unit which is configured to be supplied with the second stack and divide the second supporting body. That is, the apparatus may include a dividing unit which is configured to divide the second supporting body while unrolling of the first supporting body is stopped. Alternatively, the stack manufacturing apparatus that has the above structure may include a rolling-up unit which is configured to be supplied with the second stack and intermittently roll up the second stack. The dividing unit or the rolling-up unit may double as the control unit.

The stack manufacturing apparatus having the above structure may include a first adhesive layer curing unit which is configured to be supplied with the first stack and cure the first adhesive layer.

The stack manufacturing apparatus having the above structure may include a second adhesive layer curing unit which is configured to be supplied with a second stack and cure the second adhesive layer.

According to one embodiment of the present invention, a stack manufacturing apparatus that enables large-scale production can be provided.

According to one embodiment of the present invention, the yield in a manufacturing process of a device such as a semiconductor device, a light-emitting device, a display device, an electronic device, or a lighting device that is lightweight, thin, or flexible can be improved. According to one embodiment of the present invention, a highly reliable light-emitting device can be provided. According to one embodiment of the present invention, a novel light-emitting device or the like can be provided.

Note that the description of these effects does not disturb the existence of other effects. One embodiment of the present invention does not necessarily achieve all the objects listed above. Other effects will be apparent from and can be derived from the descriptions of the specification, the drawings, the claims, and the like.

BRIEF DESCRIPTION OF THE DRAWINGS

In the accompanying drawings:

FIGS. 1A and 1B each illustrate an example of a stack manufacturing apparatus;

FIGS. 5A and 5B illustrate examples of a stack manufacturing apparatus and a stack;

FIGS. 7A and 7B illustrate examples of a stack manufacturing apparatus and a stack;

FIGS. 15A to 15C illustrate an example of a light-emitting panel;

DETAILED DESCRIPTION OF THE INVENTION

Figure 2:
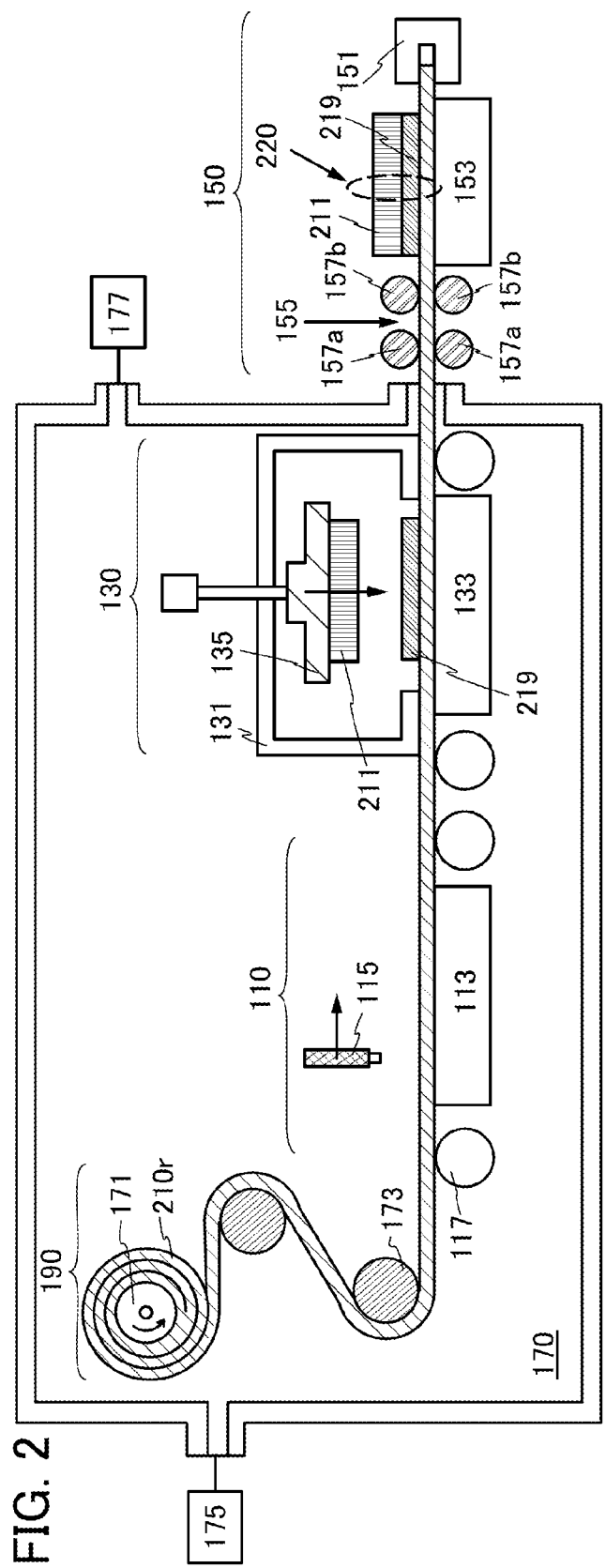
FIG. 2 illustrates an example of a stack manufacturing apparatus.

Embodiments will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the descriptions of the embodiments below.

Note that in the structures of the invention described below, the same portions or portions having similar functions are denoted by the same reference numerals in different drawings, and the descriptions of such portions are not repeated. Furthermore, the same hatching pattern is applied to portions having similar functions, and the portions are not specially denoted by reference numerals in some cases.

In addition, the position, size, range, or the like of each structure illustrated in drawings and the like is not accurately represented in some cases for easy understanding. Therefore, the disclosed invention is not necessarily limited to the position, size, range, or the like disclosed in the drawings and the like.

A variety of devices such as semiconductor devices, light-emitting devices, and display devices are desired to be made lightweight, thin, and flexible. For example, the use of a film of an organic resin, metal, an alloy, or the like for substrates of a variety of devices enables the devices to be formed lightweight, thin, and flexible.

However, a thin substrate is difficult to be handled and bonded to another member; thus, the yield might be decreased in a manufacturing process of a device.

One embodiment of the present invention relates to a manufacturing apparatus of a device using such a thin substrate (or a stack that is a part of the device). Another embodiment of the present invention relates to a manufacturing method of a device using such a thin substrate (or a stack that is a part of the device).

Note that a device that can be manufactured according to one embodiment of the present invention includes a functional element. Examples of the functional element include a semiconductor element such as a transistor; a light-emitting diode; light-emitting elements such as an inorganic EL element and an organic EL element; and a display element such as a liquid crystal element. For example, a semiconductor device including a sealed transistor and a light-emitting device including a sealed light-emitting element (here, a display device including a transistor and a light-emitting element that are sealed is also included) are also examples of the device that can be manufactured according to one embodiment of the present invention.

A layer to be separated can be formed over a formation substrate, separated from the formation substrate, and then transferred to another substrate. With this method, for example, a layer to be separated that is formed over a formation substrate having high heat resistance can be transferred to a substrate having low heat resistance (e.g., an organic resin substrate) or an element having low heat resistance (e.g., an organic EL element). The forming temperature of the layer to be separated is not limited by a material having low heat resistance. The layer to be separated is transferred to a substrate or the like that is more lightweight, thin, or flexible than the formation substrate, whereby a variety of devices such as a semiconductor device, a light-emitting device, or a display device that are lightweight, thin, and flexible can be manufactured.

Specifically, since an organic EL element is likely to deteriorate due to moisture or the like, a protective film having an excellent gas barrier property is formed over a glass substrate at a high temperature. Then, the protective film can be separated from the glass substrate and transferred to an organic resin substrate having low heat resistance, a poor gas barrier property, and flexibility. After that, an organic EL element is formed over the protective film transferred to the organic resin substrate, so that a highly reliable flexible light-emitting device can be manufactured.

Another example is as follows. After a protective film having an excellent gas barrier property is formed over a glass substrate at a high temperature and an organic EL element is formed over the protective film, the protective film and the organic EL element can be separated from the glass substrate and transferred to an organic resin substrate having a low heat resistance, a poor gas barrier property, and flexibility. By transferring the protective film and the organic EL element to the organic resin substrate, a highly reliable flexible light-emitting device can be manufactured.

Another example is as follows. After a protective film having an excellent gas barrier property is formed over a glass substrate at a high temperature, the protective film can be separated from the glass substrate and transferred to a flexible substrate over which an organic EL element is formed. By transferring the protective film to the flexible substrate over which the organic EL element is formed, a highly reliable flexible light-emitting device can be manufactured.

One embodiment of the present invention relates to a device (or a stack that is a part of the device) manufacturing apparatus using such separation and transfer. Another embodiment of the present invention relates to a device (or a stack that is a part of the device) manufacturing method using such separation and transfer.

In this specification, for example, the gas permeability, oxygen permeability, or water vapor permeability of a layer having an excellent gas barrier property is lower than or equal to $1\times10^{-5}$ [g/m$^2$·day], preferably lower than or equal to $1\times10^{-6}$ [g/m$^2$·day], more preferably lower than or equal to $1\times10^{-7}$ [g/m$^2$·day], still more preferably lower than or equal to $1\times10^{-8}$ [g/m$^2$·day].

In Embodiment 1, a stack manufacturing apparatus of one embodiment of the present invention will be described. In Embodiment 2, a flexible light-emitting panel will be described as an example of a stack that can be manufactured using the stack manufacturing apparatus of one embodiment of the present invention or a device including the stack. In Embodiment 3, an example of a light-emitting device using the light-emitting panel will be described. In Embodiment 4, examples of electronic devices and lighting devices each using the light-emitting panel will be described.

Embodiment 1

In this embodiment, a stack manufacturing apparatus of one embodiment of the present invention will be described with reference to FIGS. 1A and 1B, FIG. 2, FIG. 3, FIG. 4, FIGS. 5A and 5B, FIG. 6, and FIGS. 7A and 7B. Furthermore, a stack that can be manufactured using the stack manufacturing apparatus will be described with reference to FIGS. 8A to 8F.

A stack manufacturing apparatus of one embodiment of the present invention includes a first supporting body supply unit where a roll sheet-shaped first supporting body can be intermittently unrolled; a first adhesive layer formation unit where the first supporting body that is unrolled is supplied and a first adhesive layer can be formed over the first supporting body that is stationary; a first bonding unit where the first supporting body over which the first adhesive layer is formed and a sheet-shaped member are supplied and the member can be bonded to the first supporting body that is stationary using the first adhesive layer; and a control unit where an end portion of the first supporting body that is unrolled can be held. The stack manufacturing apparatus of one embodiment of the present invention includes a pair of tension applying devices that can apply tension to the first supporting body that is unrolled. In this embodiment, the first supporting body supply unit includes one of the pair of tension applying devices, and the control unit includes the other.

In this specification, the expression "the first supporting body is stationary" means that the first supporting body supply unit suspends unrolling of the first supporting body.

In the first supporting body supply unit of the stack manufacturing apparatus of one embodiment of the present invention, after a certain amount of first supporting body is unrolled, the unrolling is temporarily stopped. In the first adhesive layer formation unit, the first adhesive layer is formed over the first supporting body that is stationary (It can also be said that the first adhesive layer is formed over the first supporting body while unrolling of the first supporting body is stopped). In the first bonding unit, the first supporting body that is stationary and the member are bonded to each other using the first adhesive layer. After the completion of steps in the units, the unrolling of the first supporting body is resumed in the first supporting body supply unit. Then, after a certain amount of first supporting body is unrolled, the unrolling is temporarily stopped again, and the unrolling of the first supporting body is resumed after the completion of steps in the units. By repeating the series of operations, a plurality of sheet-like members can be bonded to the roll sheet-shaped first supporting body.

As the first supporting body, a roll sheet-shaped film formed using an organic resin, a metal, an alloy, glass, or the like can be used; thus, it is easy to handle the first supporting body. This allows the stack to be formed with high productivity.

The steps for manufacturing the stack can be performed while the first supporting body is stationary; thus, the manufacturing yield can be improved. In particular, in the step of bonding the first supporting body and the member, a decrease in yield can be inhibited.

Tension is applied to the first supporting body by the pair of tension applying devices, and steps for manufacturing the stack are performed while the first supporting body is stationary. Accordingly, bending or the like of the surface of the first supporting body can be inhibited, leading to improvement of the manufacturing yield.

Furthermore, the first supporting body subjected to all the steps is divided, so that a plurality of stacks in each of which the first supporting body, the first adhesive layer, and the member are stacked in this order can be manufactured. In one embodiment of the present invention, the stacks can be manufactured with high productivity.

<Structural Example 1 of Manufacturing Apparatus>

FIG. 1A illustrates a stack manufacturing apparatus of one embodiment of the present invention.

A stack manufacturing apparatus 20 illustrated in FIG. 1A includes a first supporting body supply unit 190, a first adhesive layer formation unit 110, a first bonding unit 130, and a control unit 150.

The first supporting body supply unit 190, the first adhesive layer formation unit 110, and the first bonding unit 130 are preferably provided inside a chamber 170 in which the atmosphere can be set to an inert atmosphere. In that case, entry of impurities and the like before bonding of layers of the stack can be prevented. Furthermore, the control unit 150 may be provided in the chamber 170.

The stack manufacturing apparatus 20 includes a plurality of transport rollers 117 that transports a roll sheet-shaped first supporting body 210*r*. There is no particular limitation on a transport mechanism of the first supporting body 210*r*; a belt conveyer or a transport robot may be used instead of the transport rollers.

In the first supporting body supply unit 190, the roll sheet-shaped first supporting body 210*r* can be intermittently unrolled. For example, the first supporting body 210*r* can be unrolled using an unrolling roller or the like.

The first supporting body supply unit 190 includes one of a pair of tension applying devices that can apply tension to the first supporting body 210*r* that is unrolled. For example, a roller that can unroll the roll sheet-shaped first supporting body 210*r* (e.g., an unrolling roller 171 illustrated in FIG. 2 and the like) may be provided with a tension applying device or may double as a tension applying device.

The first supporting body supply unit 190 may have a stock chamber where the first supporting body 210*r* is stored.

In the first adhesive layer formation unit 110, a first adhesive layer 219 can be formed over the first supporting body 210*r*.

In the first bonding unit 130, the first supporting body and a sheet-like member 211 can be bonded to each other using the first adhesive layer 219. A bonding step is preferably performed in a reduced-pressure atmosphere; thus, the first bonding unit 130 preferably has a chamber 131 where the atmosphere can be set to a reduced-pressure atmosphere.

The member 211 is supplied from the stock chamber 139. The atmosphere in the stock chamber 139 is also preferably set to an inert atmosphere or a reduced-pressure atmosphere so that impurities do not enter the member 211 before the bonding.

In the control unit 150, an end portion of the first supporting body 210*r* that is unrolled can be held. In the control unit 150, the rate at which the first supporting body 210*r* is unrolled, the amount of the first supporting body 210*r* that is unrolled per one unrolling operation, tension that is applied to the first supporting body 210*r*, and the like can be controlled.

The control unit 150 includes the other of the pair of tension applying devices that can apply tension to the first supporting body 210*r* that is unrolled. For example, a holding mechanism 151 that can hold an end portion of the roll sheet-shaped first supporting body 210r may be provided with a tension applying device or may double as a tension applying device.

Although FIG. 1A illustrates, as an example of the holding mechanism 151, a holding mechanism having a smaller width than the first supporting body 210r, one embodiment of the present invention is not limited thereto, and a holding mechanism having a larger width than the first supporting body 210r may be used. FIG. 1B illustrates the case of using a holding mechanism 152 having a larger width than the first supporting body 210r.

The stack manufacturing apparatus 20 includes a dividing unit. The control unit 150 doubles as the dividing unit (the unit 150 includes the dividing unit). The first supporting body 210r can be divided between a fixing mechanism 157a and a fixing mechanism 157b.

Although fixing mechanisms each having a smaller width than the first supporting body 210r are illustrated as examples of the fixing mechanisms 157a and 157b in FIG. 1A, one embodiment of the present invention is not limited thereto; fixing mechanisms each having a larger width than the first supporting body 210r may be used. FIG. 1B illustrates the case of using fixing mechanisms 156a and 156b each having a larger width than the first supporting body 210r.

Note that the fixing mechanism 157a may include or doubles as the other of the pair of tension applying devices of the control unit 150.

A process for manufacturing a stack using the stack manufacturing apparatus 20 will be described with reference to FIGS. 2 to 4.

Figure 3:
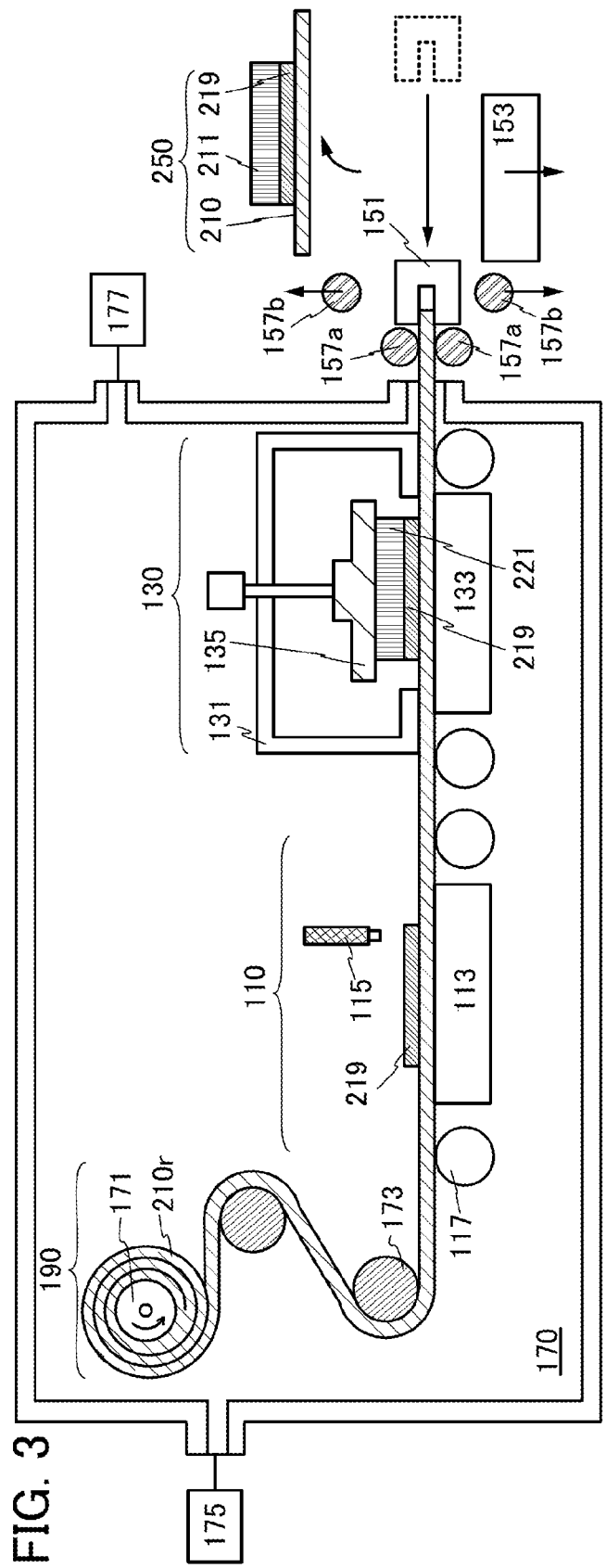
FIG. 3 illustrates an example of a stack manufacturing apparatus.
Figure 4:
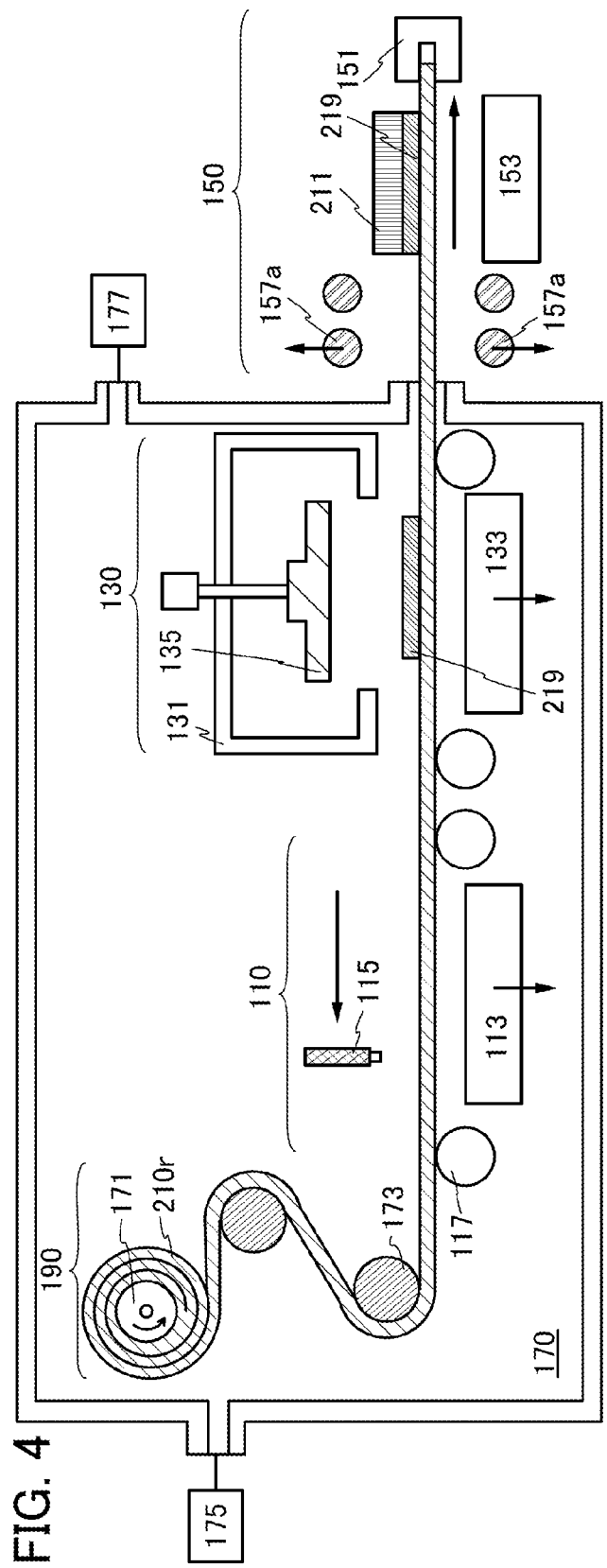
FIG. 4 illustrates an example of a stack manufacturing apparatus.

As illustrated in FIGS. 2 to 4, the chamber 170 is provided with a gas supply mechanism 175 and an exhaust mechanism 177. An inert gas is supplied from the gas supply mechanism 175 to set the atmosphere in the chamber 170 to an inert atmosphere. For example, nitrogen, a rare gas, or the like may be supplied.

First, the roll sheet-shaped first supporting body 210r is unrolled by the unrolling roller 171 in the first supporting body supply unit 190. The first supporting body 210r that is unrolled is transported to each of the units by a guide roller 173 and the transport roller 117. The unrolling roller 171 can intermittently unroll the first supporting body 210r. An end portion of the first supporting body 210r that is unrolled is held by the holding mechanism 151 in the control unit 150.

FIG. 2 illustrates an example of a state where unrolling of the first supporting body 210r is suspended in the first supporting body supply unit 190. FIG. 3 illustrates an example of a state where processes in the units are performed. FIG. 4 illustrates an example of a state where the first supporting body 210r is unrolled in the first supporting body supply unit 190.

While unrolling of the first supporting body 210r is stopped, the first adhesive layer 219 is formed over the first supporting body 210r over the stage 113 in the first adhesive layer formation unit 110.

The stage 113 is movable in at least any of the following directions: forward and backward; right and left; and up and down. Examples of a fixing mechanism for fixing the first supporting body 210r positioned over the stage 113 include chucks such as a suction chuck, an electrostatic chuck, and a mechanical chuck. For example, a porous chuck may be used. Alternatively, the first supporting body 210r may be fixed to a suction stable, a heater table, a spinner table, or the like.

There is no particular limitation on a method for forming the first adhesive layer 219; for example, a droplet discharge method, a printing method (a screen printing method or an offset printing method), a coating method such as a spin coating method or a spray coating method, a dipping method, a dispenser method, a nanoimprint method, or the like can be employed as appropriate. Alternatively, an adhesive sheet formed into a sheet shape may be bonded to the first supporting body 210r under pressure.

There is no particular limitation on an adhesive layer formation mechanism 115; for example, a printing device, a dispensing device, a coating device, an ink-jet device, a spin coater, a spray coating device, a bar coater, a slit coater, or the like can be used. Alternatively, a device that supplies an adhesive sheet formed into a sheet shape in advance may be used.

The first adhesive layer 219 may be formed over an entire region overlapping with the sheet-like member 211 bonded to the first adhesive layer 219 in a later step or may be formed into a pattern such as stripes.

While unrolling is stopped, the sheet-like member 211 is bonded to the first supporting body 210r over the stage 133 with the use of the first adhesive layer 219 in the first bonding unit 130. Accordingly, a first stack 220 including the first supporting body 210r, the first adhesive layer 219, and the member 211 can be formed.

In the first bonding unit 130, the atmosphere in the chamber 131 is set to a reduced-pressure atmosphere after the unrolling of the first supporting body 210r is suspended. After that, the sheet-like member 211 is supplied from the stock chamber 139 in a reduced-pressure atmosphere.

When the atmosphere in the chamber 131 is set to a reduced-pressure atmosphere, inclusion of impurities, air bubbles, and the like between the first supporting body 210r and the first adhesive layer 219 and between the first adhesive layer 219 and the member 211 can be inhibited. In addition, when the atmosphere in the stock chamber 139 is set to a reduced-pressure atmosphere, entry of impurities in the member 211 that has not been bonded to the first supporting body 210r can be inhibited.

The stage 133 is movable in at least any of the following directions: forward and backward; right and left; and up and down. The structure of a fixing mechanism for fixing the first supporting body 210r positioned over the stage 133 is similar to that of a fixing mechanism for the stage 113.

A member holding mechanism 135 holds the supplied sheet-like member 211. For example, the member holding mechanism 135 can hold the member 211 as in each stage.

The member 211 and the first supporting body 210r are bonded to each other with an entire bonding surface of the member 211 pressured using the member holding mechanism 135, whereby inclusion of air bubbles between the member 211 and the first supporting body 210r can be inhibited. Furthermore, thickness unevenness of the first adhesive layer 219 can be prevented. Alternatively, the member 211 and the first supporting body 210r may be bonded to each other from one end portion.

In the case where the first adhesive layer 219 is in a state of having fluidity (e.g., in a state of being not yet cured or partially cured) when pressure is applied, inclusion of air bubbles and unevenness of the film thickness can be further inhibited. Note that the first adhesive layer 219 may have adhesion in pressure application or exhibit adhesion after pressure application.

It is preferable that a material of the first adhesive layer 219 not spread beyond end portions of the member 211 and the first supporting body 210r and be not attached to the stage 133 or the like. The attachment of the material of the first adhesive layer 219 can be prevented by appropriately adjusting a pattern of the first adhesive layer 219 or the amount of the material of the first adhesive layer 219. Alternatively, the first bonding unit 130 may include a mechanism that removes the material of the first adhesive layer 219 that is attached to the stage 133 or the like. For example, an organic solvent such as acetone or a wiper such as cloth may be used.

The member holding mechanism 135 may be provided with a heating mechanism such as a heater. A thermosetting adhesive is preferably used as the first adhesive layer 219, in which case the adhesive can be cured at the same time as bonding is performed, by the heating mechanism.

The stack manufacturing apparatus may further include a first adhesive layer curing unit where the first stack is supplied and the first adhesive layer can be cured. For example, the first adhesive layer curing unit may be provided between the first bonding unit 130 and the control unit 150. The adhesive layer curing unit may include a heating mechanism (a heat source such as a heater) for curing a thermosetting adhesive or a light irradiation mechanism (a light source such as a laser or a lamp) for curing a photo-curing adhesive.

FIGS. 2 to 4 illustrate the case where the control unit 150 includes a dividing unit. While unrolling is stopped, the dividing unit divides the first supporting body 210r using a dividing mechanism 155.

The dividing unit can divide the first supporting body 210r between the fixing mechanism 157a and the fixing mechanism 157b.

The stage 153 is movable in at least any of the following directions: forward and backward; right and left; and up and down. The structure of a fixing mechanism for fixing the first supporting body 210r positioned over the stage 153 is similar to that of a fixing mechanism for the stage 113.

The dividing mechanism 155 is not particularly limited as long as it can divide the first supporting body 210r; for example, a sharp edge tool such as a cutter or a laser can be used.

The fixing mechanisms 157a and 157b are not particularly limited as long as they can fix the first supporting body 210r; for example, clips can be used. The fixing mechanisms 157a and 157b can transport the first supporting body 210r. For example, the fixing mechanisms 157a and 157b are preferably movable in at least any of the following directions: forward and backward; right and left; and up and down.

The fixing mechanism 157a includes the other of the pair of tension applying device that can apply tension to the first supporting body 210r. After the first supporting body 210r is divided, tension is applied to the first supporting body 210r in the chamber 170 by the pair of tension applying devices in the fixing mechanism 157a and the unrolling roller 171, so that the first supporting body 210r can remain stationary. The first supporting body 210r outside the chamber 170 is supported by the stage 153, the fixing mechanism 157b, and the holding mechanism 151.

In the case where tension can be kept being applied to the first supporting body 210r in the chamber 170 by the fixing mechanism 157a and the unrolling roller 171, the holding mechanism 151 does not necessarily include the tension applying device.

As illustrated in FIG. 3, after the first supporting body 210r is divided, the stage 153, the fixing mechanism 157b, and the holding mechanism 151 move to be away from the first supporting body 210r outside the chamber 170. Accordingly, the first stack 250 including the first supporting body 210, the first adhesive layer 219, and the member 211 can be taken out of the stack manufacturing apparatus 20. The stack manufacturing apparatus 20 may include a transport mechanism or a transport unit.

Then, the holding mechanism 151 moves and catches an end portion of the first supporting body 210r held by the fixing mechanism 157a.

Then, as illustrated in FIG. 4, the fixing mechanism 157a, the stage 113, the stage 133, and the chamber 131 move to be away from the first supporting body 210r. After that, unrolling of the first supporting body 210r is resumed and the first supporting body 210r is transported over the transport rollers 117. After a certain amount of first supporting body 210r is unrolled, unrolling is stopped. Then, the steps for manufacturing a stack in the units are repeated from the state in FIG. 2.

<Modification Example of Manufacturing Apparatus>

FIG. 1A and FIGS. 2 to 4 illustrate an example where the stack manufacturing apparatus 20 includes a dividing unit; however, one embodiment of the present invention is not limited thereto. As illustrated in FIG. 5A, the control unit 150 may double as an unrolling unit (may include an unrolling unit).

The control unit 150 illustrated in FIG. 5A includes a rolling-up roller 178 as the other of the pair of tension applying devices that can apply tension to the first supporting body 210r that is unrolled. The rolling-up roller 178 can hold an end portion of the unrolled first supporting body 210r. The rolling-up roller 178 can roll up a roll sheet-shaped first stack 220r.

FIG. 5B illustrates the unrolled roll-sheet-shaped first stack 220r. The first stack 220r includes a plurality of first stacks 220. The first stack 220 includes the first supporting body 210r, the first adhesive layer 219, and the member 211. That is to say, the roll-sheet-shaped first stack 220r includes the plurality of members 211 each bonded to the first supporting body 210r with the use of the first adhesive layer 219.

The first stack 220r is rolled up by the rolling-up roller 178 using the plurality of transport rollers 117 and a plurality of guide rollers 179.

The first adhesive layer formation unit 110 may include a chamber 111 in which the atmosphere can be set to a reduced-pressure atmosphere as illustrated in FIG. 5A. For example, in the case where an adhesive sheet that is formed into a sheet shape is used as a material of the first adhesive layer 219, the atmosphere in the chamber 111 is set to a reduced-pressure atmosphere when the adhesive sheet is bonded to the first supporting body 210r, whereby inclusion of air bubbles and the like can be prevented. Furthermore, a pressure application mechanism such as the pressure application roller 112 is preferably used to prevent inclusion of air bubbles and the like.

<Structural Example 2 of Manufacturing Apparatus>

FIG. 1B illustrates a stack manufacturing apparatus of another embodiment of the present invention. Note that the descriptions of the portions similar to those of Structural Example 1 are omitted.

A stack manufacturing apparatus 21 illustrated in FIG. 1B includes a first supporting body supply unit 190, a first adhesive layer formation unit 110, a first bonding unit 130, a trigger formation unit 120, a separating unit 140, a second adhesive layer formation unit 160, a second bonding unit 180, and the control unit 150.

The first supporting body supply unit 190, the first adhesive layer formation unit 110, and the first bonding unit 130 are preferably placed in the chamber 170 in which the atmosphere can be set to an inert atmosphere. Furthermore, the trigger formation unit 120, the separating unit 140, the second adhesive layer formation unit 160, the second bonding unit 180, and the control unit 150 may also be placed in the chamber 170.

The stack manufacturing apparatus 21 is provided with a plurality of transport rollers 117 for transporting the roll sheet-shaped first supporting body 210r.

The first supporting body supply unit 190, the first adhesive layer formation unit 110, the first bonding unit 130, and the control unit 150 are similar to those in the stack manufacturing apparatus 20; thus, the descriptions thereof are omitted.

In the trigger formation unit 120, a separation trigger can be formed in the first stack 220 supplied from the first bonding unit 130.

In the separating unit 140, the first stack 220 in which the separation trigger is formed can be separated into an outer layer 222 and a remaining portion 221. The outer layer 222 is stored in a stock chamber 149.

In the second adhesive layer formation unit 160, the second adhesive layer 229 can be formed over the remaining portion 221.

In the second bonding unit 180, the remaining portion 221 and a second supporting body 231r can be bonded to each other using the second adhesive layer 229. The bonding step is preferably performed in a reduced-pressure atmosphere; thus, the second bonding unit 180 preferably includes a chamber 181 in which the atmosphere can be set to a reduced-pressure atmosphere.

The second supporting body 231r may be positioned in the chamber 181. The second supporting body 231r may be supplied from the stock chamber 189 connected to the chamber 181. The atmosphere in the stock chamber 189 is also preferably set to an inert atmosphere or a reduced-pressure atmosphere so that impurities do not enter the second supporting body 231r before the bonding.

A process for manufacturing a stack using the stack manufacturing apparatus 21 will be described with reference to FIG. 6 and FIG. 7A. Steps in the first supporting body supply unit 190, the first adhesive layer formation unit 110, and the first bonding unit 130 are similar to those for the stack manufacturing apparatus 20; thus, the descriptions thereof are omitted.

Figure 6:
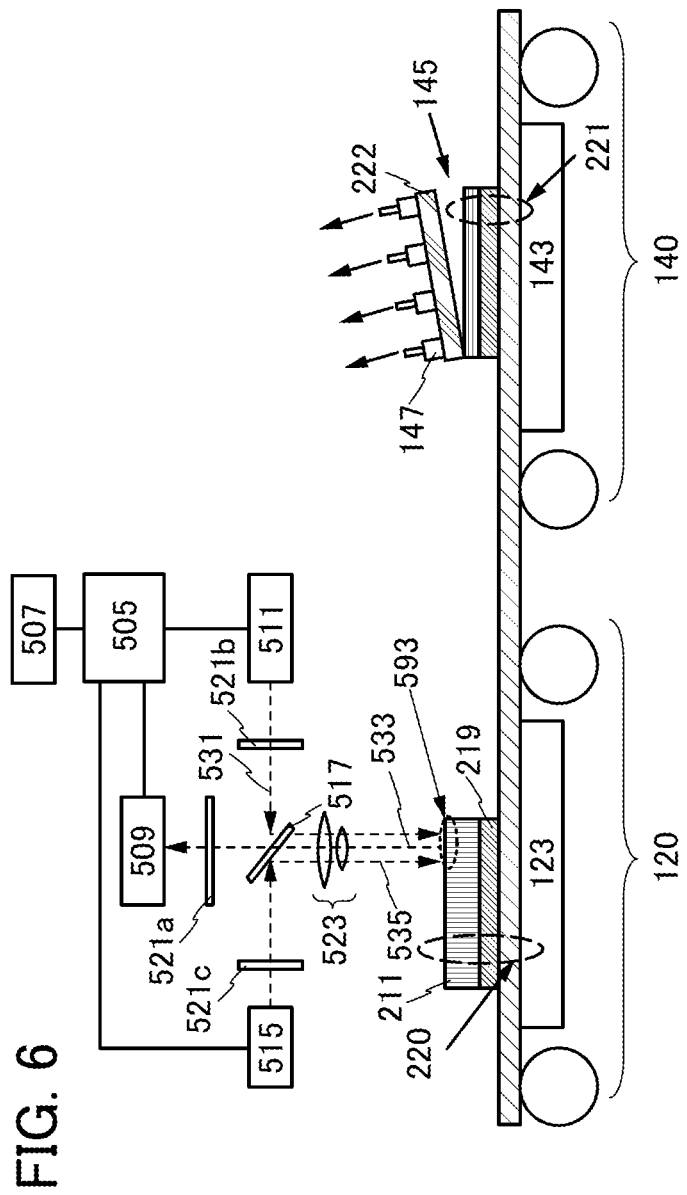
FIG. 6 illustrates an example of a stack manufacturing apparatus.

FIG. 6 and FIG. 7A illustrate an example of the trigger formation unit 120, the separating unit 140, the second adhesive layer formation unit 160, the second bonding unit 180, and the control unit 150 in a period when unrolling of the first supporting body 210r is suspended in the first supporting body supply unit 190.

As illustrated in FIG. 6, a separation trigger of the first stack 220 over a stage 123 is formed in the trigger formation unit 120 while unrolling of the first supporting body 210r is stopped.

Examples of a trigger formation mechanism include a sharp edge tool such as a cutter and a laser.

Here, the case where the trigger formation unit 120 includes a laser irradiation system will be described as an example.

The laser irradiation system included in the trigger formation unit 120 includes the stage 123, a processing portion 505, a display device 507, a camera 509, a laser apparatus 511, an alignment mechanism (not illustrated), and a light source 515.

An observation result of the camera 509 is output to the display device 507 through the processing portion 505.

For example, an optical microscope including a camera can be used as the camera 509. Light detected by the camera 509 is processed in the processing portion 505 and displayed as an image on the display device 507.

The laser apparatus 511 is capable of irradiation of laser light for forming a separation trigger.

The processing portion 505 is connected to the display device 507, the camera 509, the laser apparatus 511, the alignment mechanism, and the light source 515. Since the laser irradiation system of this embodiment include the processing portion 505, the alignment mechanism, the laser apparatus 511, and the light source 515 can be set to operate automatically depending on the observation result of the camera 509 or the like. Alternatively, a practitioner may operate as appropriate the alignment mechanism, the laser apparatus 511, and the light source 515 depending on the observation result of the camera 509 or the like, which is output to the display device 507.

Here, the case where a laser light irradiation position 593 is directly determined using the camera 509 is described as an example; however, the laser light irradiation position 593 in the first stack 220 may be determined by the distance from a marker position that is sensed.

The first stack 220 can be irradiated with light 535 from the light source 515 or the laser light 531 by changing the direction of a movable half mirror 517.

First, a shutter 521a is opened, and light is detected by the camera 509 while the stage 123 is moved with the alignment mechanism. When a shutter 521c is opened, the first stack 220 is irradiated with the light 535 from the light source 515 through the half mirror 517 and a condenser lens 523. The camera 509 is irradiated with reflected light 533 from the first stack 220 through the condenser lens 523 and the half mirror 517. As a result, the laser light irradiation position 593 in the first stack 220 is specified. At this time, a shutter 521b is closed.

Subsequently, the shutters 521a and 521c are closed, and the shutter 521b is opened by changing the direction of the half mirror 517 so that the laser light 531 is delivered from the laser apparatus 511. The laser light irradiation position 593 in the first stack 220 is irradiated with the laser light 531 through the half mirror 517 and the condenser lens 523. As a result, a separation trigger can be formed in the first stack 220.

In the separating unit 140, the first stack 220 is separated into the outer layer 222 and the remaining portion 221 as illustrated in FIG. 6 while unrolling of the first supporting body 210r is stopped. Specifically, the outer layer 222 is separated from the first stack 220 over a stage 143 using the separation trigger, whereby the first stack 220 can be separated into the outer layer 222 and the remaining portion 221.

For example, the outer layer 222 may be separated using a suction member 147 such as a suction pad.

The separating unit 140 may include a sharp edge tool 145 for being inserted into the interface at which separation is desired to be caused. By inserting the edge tool, separation can be smoothly started.

The separating unit 140 may further include a nozzle that supplies liquid to a portion where separation is in process. By supplying a liquid such as water to the portion where separation is in process, the separation strength can be reduced. Furthermore, electrostatic breakdown of the elements included in the first stack 220 can be suppressed.

While unrolling of the first supporting body 210r is stopped, the second adhesive layer 229 is formed over the remaining portion 221 over the stage 163 in the second adhesive layer formation unit 160 as illustrated in FIG. 7A.

To the second adhesive layer formation unit 160, a structure similar to that of the first adhesive layer formation unit 110 can be applied. Although an example where a structure similar to that of the adhesive layer formation mechanism 115 is used for the adhesive layer formation mechanism 165 here, a formation mechanism and a forming method different from those for the first adhesive layer formation unit 110 may be used for the second adhesive layer formation unit 160.

While unrolling is stopped, the second supporting body 231r is bonded to the remaining portion 221 over a stage 183 with the use of the second adhesive layer 229 in the second bonding unit 180. Accordingly, a second stack 223 including the remaining portion 221, the second adhesive layer 229, and the second supporting body 231r can be formed.

In the second bonding unit 180, the atmosphere in the chamber 181 is set to a reduced-pressure atmosphere after the unrolling of the first supporting body 210r is suspended. When the atmosphere in the chamber 181 is set to a reduced-pressure atmosphere, inclusion of impurities, air bubbles, and the like between the remaining portion 221 and the second adhesive layer 229 and between the second adhesive layer 229 and the second supporting body 231r can be inhibited.

The stage 183 is movable in at least any of the following directions: forward and backward; right and left; and up and down. The structure of a fixing mechanism for fixing the first supporting body 210r positioned over the stage 183 is similar to that of a fixing mechanism for the stage 113.

Although an example where the roll sheet-shaped second supporting body 231r is used is described here, the shape of the second supporting body is not limited thereto. For example, the sheet-shaped second supporting body may have a sheet shape.

An unrolling roller 185 can intermittently unroll the second supporting body 231r. An end portion of the second supporting body 231r that is unrolled may be held by either the holding mechanism 152 in the control unit 150 or another holding mechanism.

A rolling-up roller 188 can intermittently roll up a separation tape 233.

In the case where the holding mechanism 152 holds an end portion of the second supporting body 231r, the first supporting body 210r and the second supporting body 231r can be unrolled concurrently. In the case where end portions of the first supporting body 210r and the second supporting body 231r are fixed by different holding mechanisms, the first supporting body 210r and the second supporting body 231r can be unrolled individually.

First, the roll sheet-shaped second supporting body 231r is unrolled by the unrolling roller 185. The second supporting body 231r that is unrolled is transported by a guide roller 184. Then, the separation tape 233 (also called a separate film) is pulled by the rolling-up roller 188 to be separated from the second supporting body 231r.

A surface of the second supporting body 231r that is to be bonded to the second adhesive layer 229 is exposed just before bonding, whereby the second supporting body 231r can be prevented from being contaminated or damaged while being unrolled.

The separation tape 233 separated from the second supporting body 231r is rolled up by the rolling-up roller 188 using a guide roller 187. The second supporting body 231r from which the separation tape 233 is separated is transported by a direction changing roller 186 in the direction substantially the same as the direction in which the first supporting body 210r is transported.

An ionizer 191 is provided at a position where static electricity might be generated, and to perform diselectrification, air or a nitrogen gas is blown from the ionizer.

The remaining portion 221 and the second supporting body 231r are bonded to each other while pressure is applied to the bonding surface of the second supporting body 231r with the use of a pressure application roller 182, whereby inclusion of air bubbles between the remaining portion 221 and the second supporting body 231r can be inhibited. Furthermore, thickness unevenness of the second adhesive layer 229 can be prevented.

The pressure application roller 182 may be provided with a heating mechanism such as a heater. A thermosetting adhesive is preferably used as the second adhesive layer 229, in which case the adhesive can be cured at the same time as bonding is performed, by the heating mechanism.

The stack manufacturing apparatus may further include a second adhesive layer curing unit where the second stack is supplied and the second adhesive layer can be cured. For example, the second adhesive layer curing unit may be provided between the second bonding unit 180 and the control unit 150.

While unrolling of the first supporting body 210r is stopped, the dividing unit divides the first supporting body 210r and the second supporting body 231r using the dividing mechanism 155.

The dividing unit can divide the first supporting body 210r between the fixing mechanism 156a and the fixing mechanism 156b.

The fixing mechanisms 156a and 156b are not particularly limited as long as they can fix the first supporting body 210r; for example, clips can be used. The fixing mechanisms 156a and 156b are movable in at least any of the following directions: forward and backward; right and left; and up and down.

Although FIG. 1B and FIG. 7A illustrate an example where the stack manufacturing apparatus 21 includes the dividing unit, the control unit 150 may double as a rolling-up unit (may include a rolling-up unit).

FIG. 7B illustrates the unrolled roll-sheet-shaped second stack 223r that can be rolled up by a rolling-up unit. The second stack 223r includes a plurality of second stacks 223. The second stack 223 includes the remaining portion 221, the second adhesive layer 229, and the second supporting body 231r. That is to say, the roll-sheet-shaped second stack 223r includes a plurality of parts of members 211 each bonded to the first supporting body 210r with the use of the first adhesive layer 219 and the plurality of second supporting bodies 231r each bonded to the part of the member 211 with the use of the second adhesive layer 229.

<Structural Example of Stack>

A structural example of a stack that can be manufactured using a manufacturing apparatus of one embodiment of the present invention will be described with reference to FIGS. 8A to 8F.

Figure 8A:
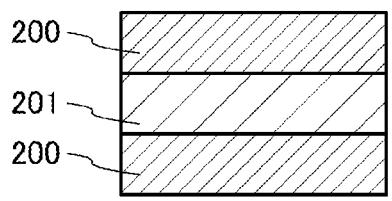
FIGS. 8A to 8F illustrate examples of stacks.

The stack illustrated in FIG. 8A includes an element layer 201 between a pair of layers 200 having an excellent gas barrier property. The layers 200 having an excellent gas barrier property provided over and below the element layer 201 can inhibit deterioration of a functional element included in the element layer 201 due to impurities such as moisture.

Figure 8B:
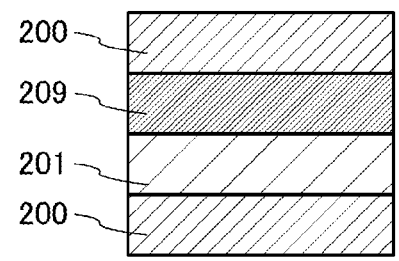

A stack illustrated in FIG. 8B can be manufactured using the stack manufacturing apparatus 20 in FIG. 1A. For example, first, the roll sheet-shaped layer 200 having an excellent gas barrier property is supplied from the first supporting body supply unit 190, and an adhesive layer 209 is formed in the first adhesive layer formation unit 110. Then, the sheet-shaped layer 200 having an excellent gas barrier property over which the element layer 201 is formed is supplied to the first bonding unit 130 and bonded to the roll sheet-shaped layer 200 having an excellent gas barrier property with the use of the adhesive layer 209. In this manner, the stack illustrated in FIG. 8B can be manufactured.

A stack manufacturing apparatus of one embodiment of the present invention may include a functional element formation unit. For example, the roll sheet-shaped layer 200 having an excellent gas barrier property is supplied from the first supporting body supply unit 190 and the element layer 201 is formed over the roll sheet-shaped layer 200 having an excellent gas barrier property in the functional element formation unit. Then, the adhesive layer 209 is formed over the element layer 201 in the first adhesive layer formation unit 110. After that, the sheet-shaped layer 200 having an excellent gas barrier property is supplied to the first bonding unit 130 and is bonded to the element layer 201 with the use of the adhesive layer 209. In this manner, the stack illustrated in FIG. 8B can be manufactured.

Figure 8C:
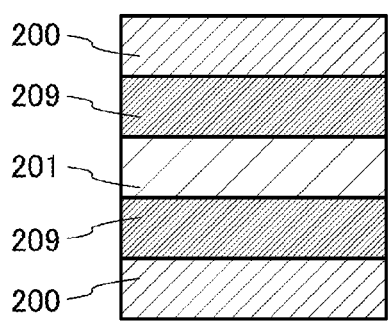

A stack illustrated in FIG. 8C can be manufactured using the stack manufacturing apparatus 21 in FIG. 1B. For example, first, the element layer 201 is formed over a formation substrate having high heat resistance with a separation layer (see Embodiment 2) interposed therebetween, so that a sheet-like member 211 is obtained. Then, in the stack manufacturing apparatus 21, the roll sheet-shaped layer 200 having an excellent gas barrier property is supplied from the first supporting body supply unit 190 to the first adhesive layer formation unit 110, and the adhesive layer 209 is formed over the roll sheet-shaped layer 200 having an excellent gas barrier property in the first adhesive layer formation unit 110. Then, the sheet-like member 211 including the element layer 201 is supplied to the first bonding unit 130 and is bonded to the roll sheet-shaped layer 200 having an excellent gas barrier property with the use of the adhesive layer 209. Then, a separation trigger is formed in the sheet-like member 211 in the trigger formation unit 120. The sheet-like member 211 in which the separation trigger is formed is separated into the outer layer 222 and the remaining portion (element layer 201) in the separating unit 140. Then, the adhesive layer 209 is formed over the element layer 201 in the second adhesive layer formation unit 160. After that, the sheet-shaped layer 200 having an excellent gas barrier property is supplied to the second bonding unit 180 and is bonded to the element layer 201 with the use of the adhesive layer 209. In this manner, the stack illustrated in FIG. 8C can be manufactured.

In the method for manufacturing a stack, the element layer 201 can be formed over the formation substrate different from the layer 200 having an excellent gas barrier property over which the stack is to be formed. The formation method of the element layer 201 is thus not limited by a material of the layer 200 having an excellent gas barrier property, and the method for manufacturing a stack is preferably employed. For example, a material having low heat resistance and an excellent gas barrier property can be used.

Figure 8D:
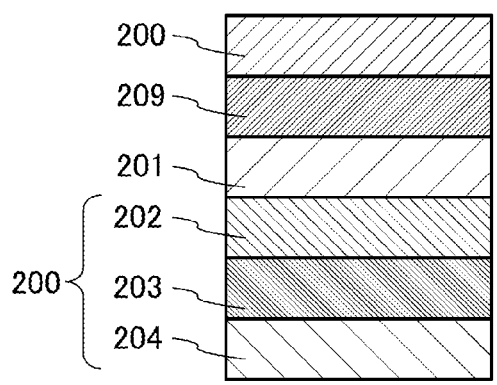

As illustrated in FIG. 8D, the layer 200 having an excellent gas barrier property 200 may have a layered structure in which a layer 204 having a poor gas barrier property and the layer 202 having an excellent gas barrier property are bonded to each other using an adhesive layer 203.

A stack illustrated in FIG. 8D can be manufactured using the stack manufacturing apparatus 21 in FIG. 1B. For example, first, a layer 202 having an excellent gas barrier property and the element layer 201 are formed in this order over a formation substrate having high heat resistance with a separation layer interposed therebetween, so that the sheet-like member 211 is obtained. Then, the roll sheet-shaped layer 200 having an excellent gas barrier property is supplied from the first supporting body supply unit 190 to the first adhesive layer formation unit 110, and the adhesive layer 209 is formed over the roll sheet-shaped layer 200 having an excellent gas barrier property in the first adhesive layer formation unit 110. Then, the sheet-like member 211 including layer 202 having an excellent gas barrier property and the element layer 201 is supplied to the first bonding unit 130 and is bonded to the roll sheet-shaped layer 200 having an excellent gas barrier property with the use of the adhesive layer 209. Then, a separation trigger is formed in the sheet-like member 211 in the trigger formation unit 120. The sheet-like member 211 in which the separation trigger is formed is separated into the outer layer 222 and the remaining portion (the layer 202 having an excellent gas barrier property and the element layer 201) in the separating unit 140. Then, the adhesive layer 203 is formed over the layer 202 having an excellent gas barrier property in the second adhesive layer formation unit 160. After that, the sheet-shaped layer 204 having a poor gas barrier property is supplied to the second bonding unit 180 and is bonded to the layer 202 having an excellent gas barrier property with the use of the adhesive layer 203. In this manner, the stack illustrated in FIG. 8D can be manufactured.

In the method for manufacturing a stack, the element layer 201 can be formed over the formation substrate different from the layer 200 having an excellent gas barrier property over which the stack is to be formed and the layer 204 having a poor gas barrier property. The formation method of the element layer 201 is thus not limited by a material of the layer 200 having an excellent gas barrier property and a material of the layer 204 having a poor gas barrier property, and the method for manufacturing a stack is preferably employed. For example, the element layer 201 and the layer 202 having an excellent gas barrier property can be formed over a formation substrate having high heat resistance.

Figure 8E:
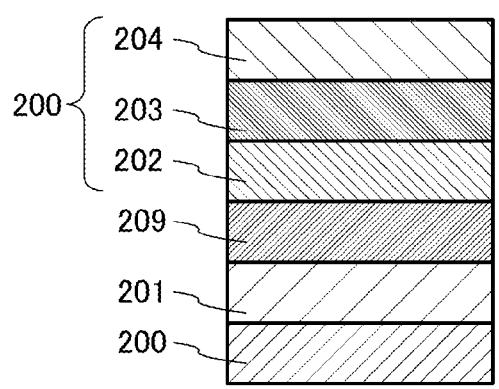

An example of a manufacturing method of a stack illustrated in FIG. 8E is as follows. First, the roll sheet-shaped layer 200 having an excellent gas barrier property is supplied from the first supporting body supply unit 190 and the element layer 201 is formed over the roll sheet-shaped layer 200 having an excellent gas barrier property in a functional element formation unit. Then, the adhesive layer 209 is formed over the element layer 201 in the first adhesive layer formation unit 110. Then, the sheet-like member 211 including the layer 202 having an excellent gas barrier property is supplied to the first bonding unit 130 and is bonded to the element layer 201 with the use of the adhesive layer 209. Then, a separation trigger is formed in the sheet-like member 211 in the trigger formation unit 120. The sheet-like member 211 in which the separation trigger is formed is separated into the outer layer 222 and the remaining portion (the layer 202 having an excellent gas barrier property) in the separating unit 140. Then, the adhesive layer 203 is formed over the layer 202 having an excellent gas barrier property in the second adhesive layer formation unit 160. After that, the sheet-shaped layer 204 having a poor gas barrier property is supplied to the second bonding unit 180 and is bonded to the layer 202 having an excellent gas barrier property with the use of the adhesive layer 203. In this manner, the stack illustrated in FIG. 8E can be manufactured.

The number of each of the units in a stack manufacturing apparatus of one embodiment of the present invention may be more than one. For example, the stack manufacturing apparatus of one embodiment of the present invention may include a plurality of trigger formation units and a plurality of dividing units.

Figure 8F:
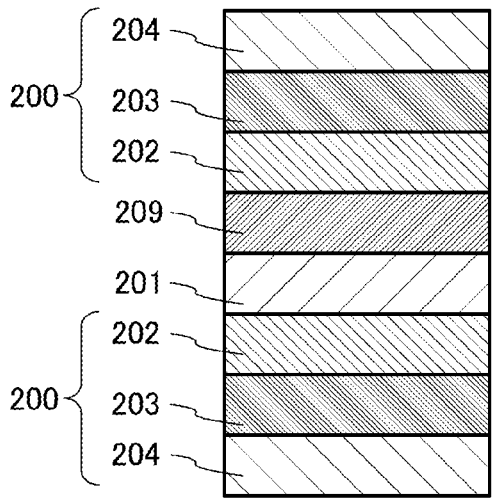

An example of a manufacturing method of a stack illustrated in FIG. 8F is as follows. First, the roll sheet-shaped layer 204 having a poor gas barrier property is supplied from the first supporting body supply unit 190 and the adhesive layer 203 is formed over the roll sheet-shaped layer 204 having a poor gas barrier property in the first adhesive layer formation unit 110. Then, the sheet-like member 211 including the layer 202 having an excellent gas barrier property is supplied to the first bonding unit 130 and is bonded to the roll sheet-shaped layer 204 having a poor gas barrier property with the use of the adhesive layer 203. Then, a separation trigger is formed in the sheet-like member 211 in the trigger formation unit 120. The sheet-like member 211 in which the separation trigger is formed is separated into the outer layer 222 and the remaining portion (the layer 202 having an excellent gas barrier property) in the separating unit 140. Then, the adhesive layer 209 is formed over the layer 202 having an excellent gas barrier property in the second adhesive layer formation unit 160. Then, a sheet-like member including the layer 202 having an excellent gas barrier property and the element layer 201 is supplied to the second bonding unit 180 and is bonded to the roll sheet-shaped layer 202 having an excellent gas barrier property with the use of the adhesive layer 209. Then, a separation trigger is formed in the sheet-like member in a second trigger formation unit. The sheet-like member in which the separation trigger is formed is separated into an outer layer and the remaining portion (the layer 202 having an excellent gas barrier property and the element layer 201) in a second separating unit. Then, the adhesive layer 203 is formed over the layer 202 having an excellent gas barrier property in a third adhesive layer formation unit. After that, the sheet-shaped layer 204 having a poor gas barrier property is supplied to a third bonding unit and is bonded to the layer 202 having an excellent gas barrier property with the use of the adhesive layer 203. In this manner, the stack illustrated in FIG. 8F can be manufactured.

In the above-described manner, a highly reliable stack (or device) in which an element layer is sandwiched between a pair of layers having an excellent barrier property can be manufactured using the stack manufacturing apparatus of one embodiment of the present invention. Note that the use of a flexible material for each layer enables manufacture of a flexible stack (or a flexible device).

This embodiment can be combined with any of the other embodiments as appropriate.

Embodiment 2

In this embodiment, a flexible light-emitting panel that can be manufactured according to one embodiment of the present invention will be described with reference to FIGS. 9A to 9D, FIGS. 10A to 10C, FIGS. 11A and 11B, and FIGS. 12A and 12B.

A light-emitting panel of this embodiment includes an organic EL element as a light-emitting element. The light-emitting panel of this embodiment has high reliability because of the organic EL element provided between a pair of barrier layers. Note that a layer having an excellent barrier property is also referred to as a barrier layer in this specification.

One of the pair of barrier layers transmits light emitted from the organic EL element. For the light-emitting panel of this embodiment, any of a top-emission organic EL element, a bottom-emission organic EL element, and a dual-emission organic EL element can be used.

According to one embodiment of the present invention, a passive matrix light-emitting panel and an active matrix light-emitting panel where driving of a light-emitting element is controlled by a transistor can be manufactured.

<Structural Example 1 of Light-Emitting Panel>

Figure 9A:
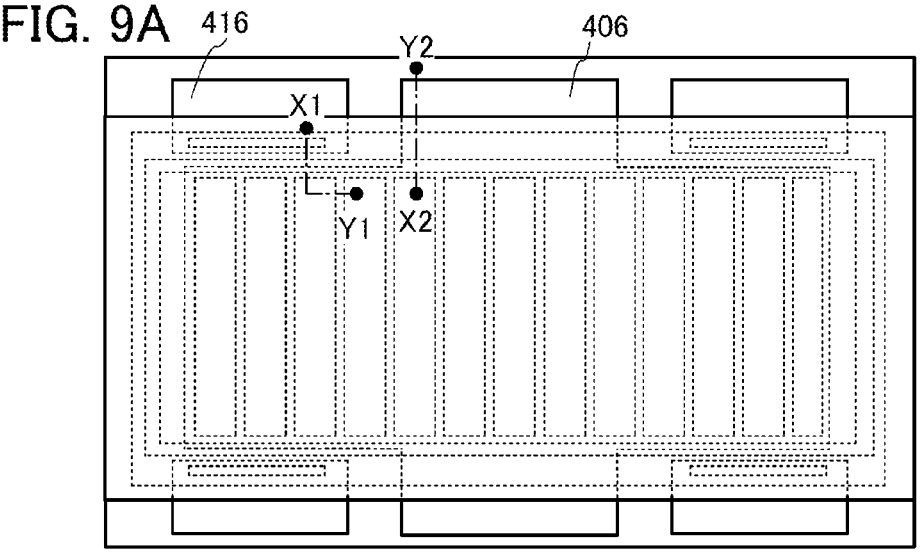
FIGS. 9A to 9D illustrate examples of light-emitting panels.
Figure 9B:
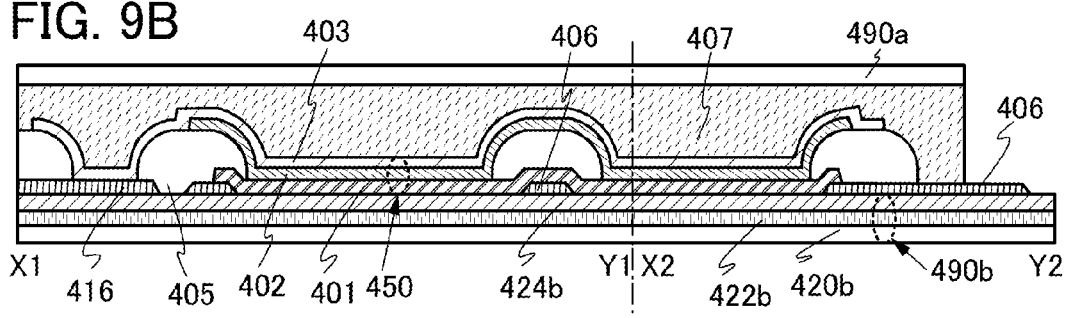

FIG. 9A is a plan view of a light-emitting panel. FIG. 9B is a cross-sectional view along dashed-dotted lines X1-Y1 and X2-Y2 in FIG. 9A.

A light-emitting panel illustrated in FIG. 9B includes a barrier layer 490b, a conductive layer 406, a conductive layer 416, an insulating layer 405, an organic EL element 450 (a first electrode 401, an EL layer 402, and a second electrode 403), an adhesive layer 407, and a barrier layer 490a.

In Structural Example 1, the barrier layer 490a is formed of a flexible substrate having an excellent barrier property, and the barrier layer 490b is formed of a flexible substrate 420b, an adhesive layer 422b, and an insulating layer 424b having an excellent barrier property.

The organic EL element 450 includes the first electrode 401 over the barrier layer 490a, the EL layer 402 over the first electrode 401, and the second electrode 403 over the EL layer 402. The organic EL element 450 is sealed by the barrier layer 490a, the adhesive layer 407, and the barrier layer 490b.

End portions of the first electrode 401, the conductive layer 406, and the conductive layer 416 are covered with the insulating layer 405. The conductive layer 406 is electrically connected to the first electrode 401, and the conductive layer 416 is electrically connected to the second electrode 403. The conductive layer 406 covered with the insulating layer 405 with the first electrode 401 therebetween functions as an auxiliary wiring and is electrically connected to the first electrode 401. It is preferable that the auxiliary wiring be electrically connected to an electrode of the organic EL element, in which case a voltage drop due to electrical resistance of the electrode can be suppressed. The conductive layer 406 may be provided over the first electrode 401. Furthermore, an auxiliary wiring that is electrically connected to the second electrode 403 may be provided, for example, over the insulating layer 405.

To increase the light extraction efficiency of the light-emitting panel, a light extraction structure may be provided on the side from which light of the light-emitting element is extracted.

An example of a manufacturing method of the light-emitting panel of Structural Example 1 will be described below. The light-emitting panel of Structural Example 1 can be manufactured using the stack manufacturing apparatus 21 in FIG. 1B.

For example, first, a separation layer is formed over a formation substrate having high heat resistance. Then, layers from the insulating layer 424b having an excellent barrier property to the organic EL element 450 are formed as layers to be separated, over the separation layer. The layers correspond to the sheet-like member 211.

The first supporting body supply unit 190 supplies the roll sheet-shaped barrier layer 490a. In the first adhesive layer formation unit 110, the adhesive layer 407 is formed over the roll sheet-shaped barrier layer 490a. In the first bonding unit 130, the sheet-like member 211 and the barrier layer 490a are bonded to each other using the adhesive layer 407. In the trigger formation unit 120, a separation trigger is formed in the member 211. In the separating unit 140, the member 211 in which the separation trigger is formed is separated into an outer layer (the formation substrate and the separation layer) and the remaining portion (the layers from the insulating layer 424b having an excellent barrier property to the organic EL element 450). In the second adhesive layer formation unit 160, the adhesive layer 422b is formed over the insulating layer 424b having an excellent barrier property. In the second bonding unit 180, the insulating layer 424b having an excellent barrier property and the roll sheet-shaped flexible substrate 420b are bonded to each other using the adhesive layer 422b.

Alternatively, a stack manufacturing apparatus that includes a formation unit of an organic EL element may be used. For example, the insulating layer 424b having an excellent barrier property formed over a formation substrate having high heat resistance with a separation layer therebetween is transferred to the roll sheet-shaped flexible substrate 420b with the use of the adhesive layer 422b. Then, the organic EL element 450 is formed over the insulating layer 424b having an excellent barrier property, and after that, the organic EL element 450 and the roll sheet-shaped barrier layer 490a are bonded to each other with the use of the adhesive layer 407.

<Structural Example 2 of Light-Emitting Panel>

Figure 9C:
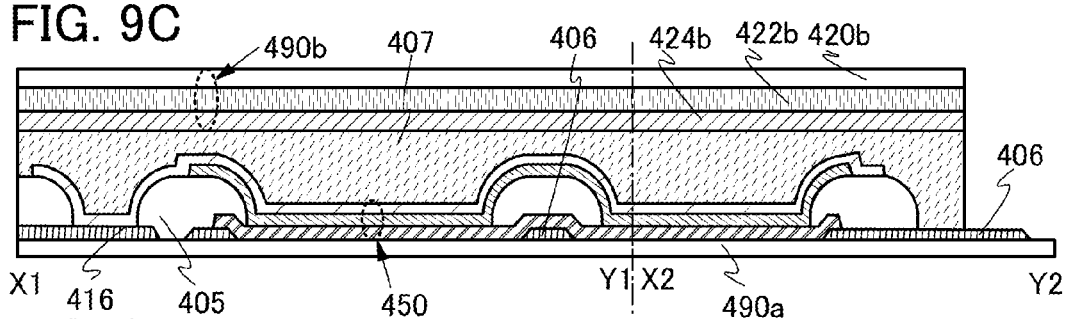

FIG. 9A is a plan view of a light-emitting panel. FIG. 9C is a cross-sectional view along dashed-dotted lines X1-Y1 and X2-Y2 in FIG. 9A. Note that the descriptions of the portions similar to those of Structural Example 1 are omitted.

The light-emitting panel illustrated in FIG. 9C includes the barrier layer 490a, the conductive layer 406, the conductive layer 416, the insulating layer 405, the organic EL element 450, the adhesive layer 407, and the barrier layer 490b.

In Structural Example 2, the barrier layer 490a is formed of a flexible substrate having an excellent barrier property, and the barrier layer 490b is formed of the flexible substrate 420b, the adhesive layer 422b, and the insulating layer 424b having an excellent barrier property.

An example of a manufacturing method of the light-emitting panel of Structural Example 2 will be described below. The light-emitting panel of Structural Example 2 can be manufactured using the stack manufacturing apparatus that includes a formation unit of an organic EL element.

For example, first, the organic EL element 450 is directly formed on the roll sheet-shaped barrier layer 490a. Then, the insulating layer 424b having an excellent barrier property formed over a formation substrate having high heat resistance with a separation layer therebetween is transferred to the organic EL element 450 with the use of the adhesive layer 407. After that, the insulating layer 424b having an excellent barrier property and the roll sheet-shaped flexible substrate 420b are bonded to each other with the use of the adhesive layer 422b.

<Structural Example 3 of Light-Emitting Panel>

Figure 9D:
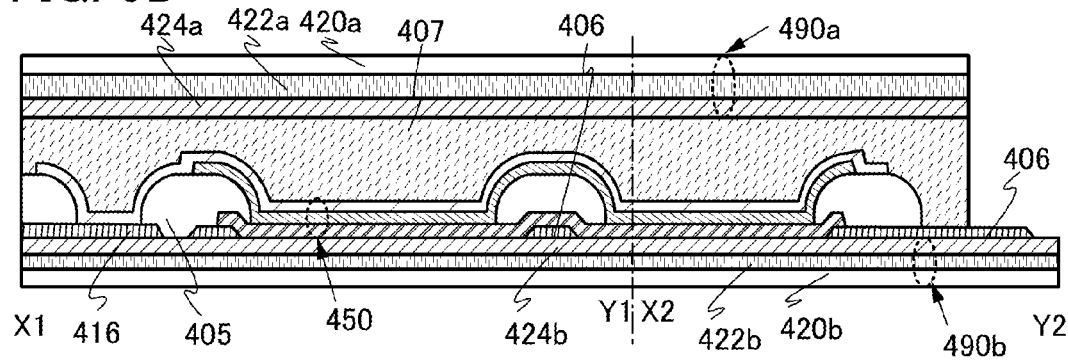

FIG. 9A is a plan view of a light-emitting panel. FIG. 9D is a cross-sectional view along dashed-dotted lines X1-Y1 and X2-Y2 in FIG. 9A. Note that the descriptions of the portions similar to those of Structural Examples 1 and 2 are omitted.

The light-emitting panel illustrated in FIG. 9D includes the barrier layer 490b, the conductive layer 406, the conductive layer 416, the insulating layer 405, the organic EL element 450, the adhesive layer 407, and the barrier layer 490a.

In Structural Example 3, the barrier layer 490a is formed of a flexible substrate 420a, an adhesive layer 422a, and an insulating layer 424a having an excellent barrier property, and the barrier layer 490b is formed of the flexible substrate 420b, the adhesive layer 422b, and the insulating layer 424b having an excellent barrier property.

An example of a manufacturing method of the light-emitting panel of Structural Example 3 will be described below. The light-emitting panel of Structural Example 3 can be manufactured using a stack manufacturing apparatus that includes two trigger formation units, two separating units, three adhesive layer formation units, and three bonding units.

For example, the insulating layer 424a having an excellent barrier property is formed over a formation substrate having high heat resistance with a separation layer therebetween. In addition, layers from the insulating layer 424b having an excellent barrier property to the organic EL element 450 are formed as layers to be separated, over another formation substrate having high heat resistance with a separation layer therebetween. Then, the insulating layer 424a having an excellent barrier property is transferred to the roll sheet-shaped flexible substrate 420a with the use of the adhesive layer 422a, and after that, the layers to be separated are transferred to the insulating layer 424a having an excellent barrier property with the use of the adhesive layer 407. Then, the insulating layer 424b having an excellent barrier property and the roll sheet-shaped flexible substrate 420b are bonded to each other using the adhesive layer 422b.

The stack manufacturing apparatus may further include a formation unit of an organic EL element. For example, the insulating layer 424b having an excellent barrier property formed over a formation substrate having high heat resistance with a separation layer therebetween is transferred to the roll sheet-shaped flexible substrate 420b with the use of the adhesive layer 422b. Then, the organic EL element 450 is formed over the insulating layer 424b having an excellent barrier property. Furthermore, the insulating layer 424a having an excellent barrier property formed over the formation substrate having high heat resistance with the separation layer therebetween is transferred to the organic EL element 450 with the use of the adhesive layer 407. After that, the insulating layer 424a having an excellent barrier property and the roll sheet-shaped flexible substrate 420a are bonded to each other using the adhesive layer 422a.

<Structural Example 4 of Light-Emitting Panel>

Figure 10A:
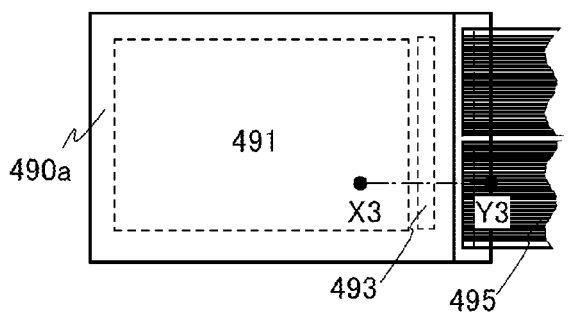
FIGS. 10A to 10C illustrate examples of light-emitting panels.
Figure 10B:
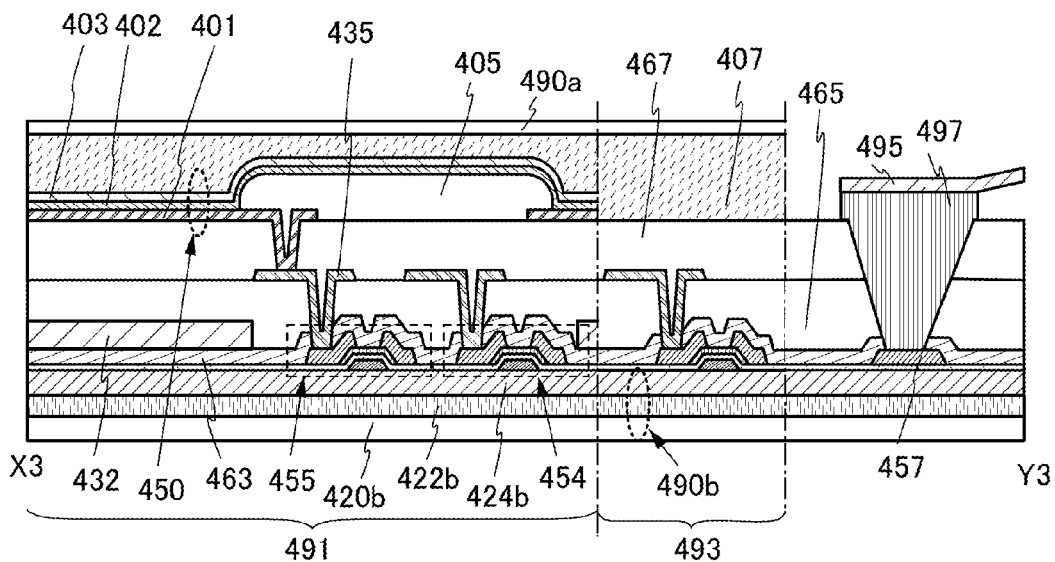

FIG. 10A is a plan view of a light-emitting panel. FIG. 10B is a cross-sectional view along dashed-dotted line X3-Y3 in FIG. 10A. The light-emitting panel illustrated in FIG. 10B is a bottom-emission light-emitting panel fabricated using a color filter method.

The light-emitting panel illustrated in FIG. 10A includes a light-emitting portion 491, a driver circuit portion 493, and a flexible printed circuit (FPC) 495. An organic EL element and transistors included in the light-emitting portion 491 and the driver circuit portion 493 are sealed with the barrier layers 490a and 490b and the adhesive layer 407.

The light-emitting panel in FIG. 10B includes the barrier layer 490b, a transistor 454, a transistor 455, an insulating layer 463, a coloring layer 432, an insulating layer 465, a conductive layer 435, an insulating layer 467, the insulating layer 405, the organic EL element 450 (the first electrode 401, the EL layer 402, and the second electrode 403), the adhesive layer 407, the barrier layer 490a, and a conductive layer 457. The barrier layer 490a, the insulating layer 463, the insulating layer 465, the insulating layer 467, and the first electrode 401 transmit visible light.

In Structural Example 4, the barrier layer 490a is formed of a flexible substrate having an excellent barrier property, and the barrier layer 490b is formed of the flexible substrate 420b, the adhesive layer 422b, and the insulating layer 424b having an excellent barrier property.

A light-emitting portion 491 of the light-emitting panel illustrated in FIG. 10B includes, over the barrier layer 490b, the switching transistor 454, the current-controlling transistor 455, and the organic EL element 450. The organic EL element 450 includes the first electrode 401 over the insulating layer 467, the EL layer 402 over the first electrode 401, and the second electrode 403 over the EL layer 402. The first electrode 401 is electrically connected to a source electrode or a drain electrode of the transistor 455 through the conductive layer 435. An end portion of the first electrode 401 is covered with the insulating layer 405. The second electrode 403 preferably reflects visible light. Moreover, the light-emitting panel includes, over the insulating layer 463, the coloring layer 432 overlapping with the organic EL element 450.

The driver circuit portion 493 includes a plurality of transistors. FIG. 10B illustrates one of the transistors in the driver circuit portion 493.

The conductive layer 457 is electrically connected to an external input terminal through which a signal (e.g., a video signal, a clock signal, a start signal, and a reset signal) or a potential from the outside is transmitted to the driver circuit portion 493. Here, an example in which the FPC 495 is provided as the external input terminal is described.

To prevent an increase in the number of manufacturing steps, the conductive layer 457 is preferably formed using the same material and the same step as those of the electrode or the wiring in the light-emitting portion or the driver circuit portion. Here, an example is described in which the conductive layer 457 is formed using the same material and the same step as those of the source electrode and the drain electrode of the transistor.

The insulating layer 463 has an effect of suppressing diffusion of impurities into a semiconductor included in the transistor. As the insulating layer 465 and the insulating layer 467, an insulating layer having a planarization function is preferably selected in order to reduce surface unevenness due to the transistor and the wiring.

An example of a manufacturing method of the light-emitting panel of Structural Example 4 will be described below. The light-emitting panel of Structural Example 4 can be manufactured using the stack manufacturing apparatus 21 in FIG. 1B.

Figure 10C:
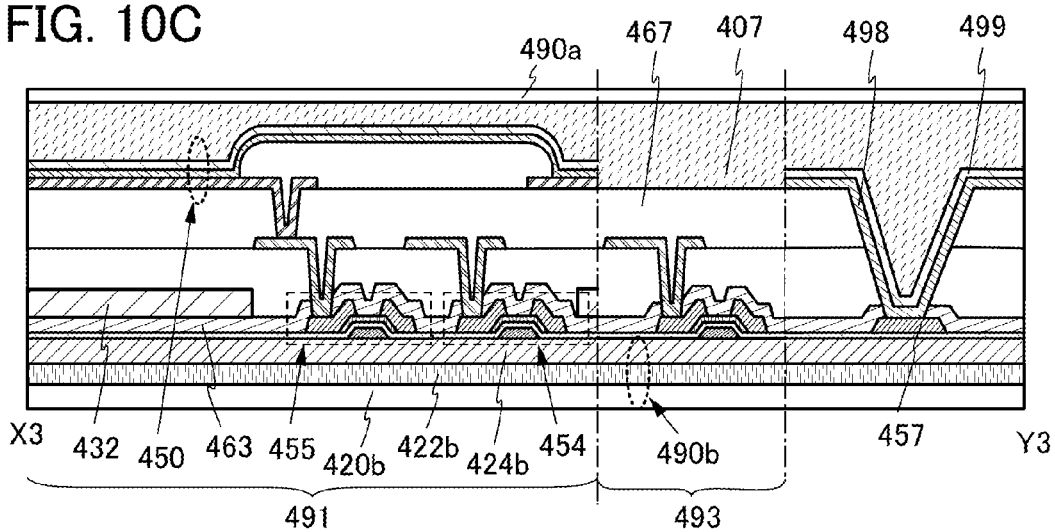

For example, first, a separation layer is formed over a formation substrate having high heat resistance. Then, layers from the insulating layer 424b having an excellent barrier property to the organic EL element 450 are formed as layers to be separated, over the separation layer. The layers correspond to the sheet-like member 211. In this process, the EL layer 498 that overlaps with the conductive layer 457 is preferably formed in the same step as the EL layer 402 as illustrated in FIG. 10C. In addition, the conductive layer 499 that overlaps with the conductive layer 457 is preferably formed in the same step as the second electrode 403.

The first supporting body supply unit 190 supplies the roll sheet-shaped barrier layer 490a. In the first adhesive layer formation unit 110, the adhesive layer 407 is formed over the roll sheet-shaped barrier layer 490a. In the first bonding unit 130, the sheet-like member 211 and the barrier layer 490a are bonded to each other using the adhesive layer 407. In the trigger formation unit 120, a separation trigger is formed in the member 211. In the separating unit 140, the member 211 in which the separation trigger is formed is separated into an outer layer (the formation substrate and the separation layer) and the remaining portion (the layers from the insulating layer 424b having an excellent barrier property to the organic EL element 450). In the second adhesive layer formation unit 160, the adhesive layer 422b is formed over the insulating layer 424b having an excellent barrier property. In the second bonding unit 180, the insulating layer 424b having an excellent barrier property and the roll sheet-shaped flexible substrate 420b are bonded to each other using the adhesive layer 422b.

Next, the conductive layer 457 is exposed. For example, a region of the barrier layer 490a that overlaps with the conductive layer 457 may be damaged by an edge toll such as a needle or a cutter or irradiated with laser light. Then, an adhesive roller is pressed against the barrier layer 490a and the roller is rolled and moved relatively. Alternatively, an adhesive tape may be attached to the barrier layer 490a and then peeled. Adhesion between the EL layer 498 and the conductive layer 499 and adhesion between layers included in the EL layer 498 are low; therefore, separation occurs at an interface between the EL layer 498 and the conductive layer 499 or in the EL layer 498. Thus, the layers that overlap with the conductive layer 457 can be removed selectively, and the conductive layer 457 can be exposed. Note that in the case where the EL layer 498 or the like remains over the conductive layer 457, it may be removed with an organic solvent or the like.

Note that there is no limitation on a method for removing the layers overlapping with the conductive layer 457 as long as the conductive layer 457 can be exposed and electrically connected to the FPC 495 in a subsequent step. The EL layer 498 or the conductive layer 499 does not necessarily overlap with the conductive layer 457. For example, the conductive layer 499 is not necessarily provided in the case where separation occurs in the EL layer 498. Moreover, when the EL layer 498 and the adhesive layer 407 are in contact with each other, for example, materials of the two layers might be mixed or an interface between the layers might become unclear depending on the materials to be used. In such a case, the conductive layer 499 is preferably provided between the EL layer 498 and the adhesive layer 407 to suppress a reduction in the reliability of the light-emitting panel.

After that, the FPC 495 is electrically connected to the exposed conductive layer 457 through a connector 497.

<Structural Example 5 of Light-Emitting Panel>

Figure 11A:
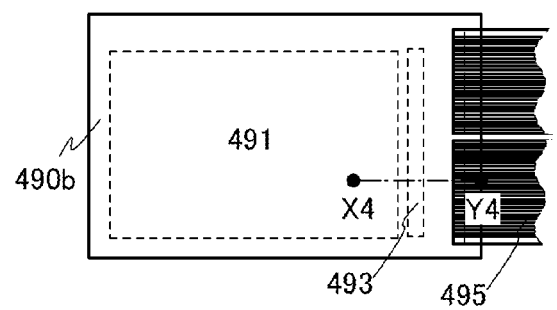
FIGS. 11A and 11B illustrate an example of a light-emitting panel.
Figure 11B:
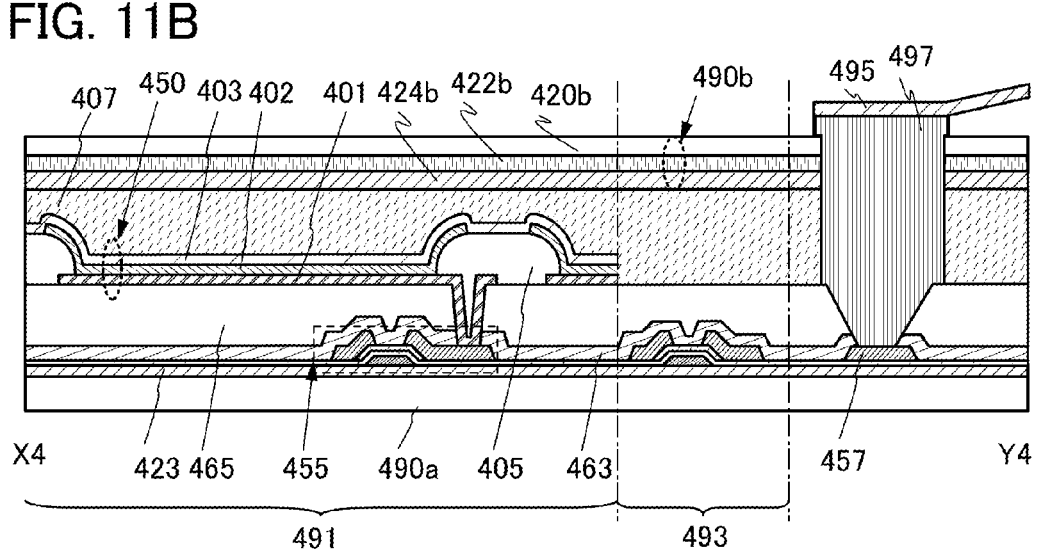

FIG. 11A is a plan view of a light-emitting panel, and FIG. 11B is a cross-sectional view along dashed-dotted line X4-Y4 in FIG. 11A. The light-emitting panel illustrated in FIG. 11B is a top-emission light-emitting panel fabricated using a side-by-side method. Note that the descriptions of the portions similar to those of Structural Example 4 are omitted.

The light-emitting panel illustrated in FIG. 11A includes the light-emitting portion 491, the driver circuit portion 493, and the FPC 495. An organic EL element and transistors included in the light-emitting portion 491 and the driver circuit portion 493 are sealed with the barrier layers 490a and 490b and the adhesive layer 407.

The light-emitting panel illustrated in FIG. 11B includes the barrier layer 490a, a base film 423, a transistor 455, the insulating layer 463, the insulating layer 465, the insulating layer 405, the organic EL element 450, the adhesive layer 407, the barrier layer 490b, and the conductive layer 457.

The barrier layer 490b, the adhesive layer 407, and the second electrode 403 transmit visible light.

In Structural Example 5, the barrier layer 490a is formed of a flexible substrate having an excellent barrier property, and the barrier layer 490b is formed of the flexible substrate 420b, the adhesive layer 422b, and the insulating layer 424b having an excellent barrier property.

In the light-emitting portion 491 of the light-emitting panel illustrated in FIG. 11B, the transistor 455 and the organic EL element 450 are provided over the barrier layer 490a. The organic EL element 450 includes the first electrode 401 over the insulating layer 465, the EL layer 402 over the first electrode 401, and the second electrode 403 over the EL layer 402. The first electrode 401 is electrically connected to a source electrode or a drain electrode of the transistor 455. The first electrode 401 preferably reflects visible light. An end portion of the first electrode 401 is covered with the insulating layer 405.

The driver circuit portion 493 includes a plurality of transistors. FIG. 11B illustrates one of the transistors in the driver circuit portion 493.

The conductive layer 457 is electrically connected to an external input terminal through which a signal or a potential from the outside is transmitted to the driver circuit portion 493. Here, an example in which the FPC 495 is provided as the external input terminal is described. A connector 497 over the barrier layer 490b is connected to the conductive layer 457 through an opening formed in the barrier layer 490b, the adhesive layer 407, the insulating layer 465, and the insulating layer 463. Moreover, the connector 497 is connected to the FPC 495. The FPC 495 and the conductive layer 457 are electrically connected to each other through the connector 497.

An example of a manufacturing method of the light-emitting panel of Structural Example 5 will be described below. The light-emitting panel of Structural Example 5 can be manufactured using the stack manufacturing apparatus that includes a formation unit of an organic EL element.

For example, first, the organic EL element 450 is directly formed on the roll sheet-shaped barrier layer 490a. The base film 423 does not have to be provided if unnecessary. Then, the insulating layer 424b having an excellent barrier property formed over a formation substrate having high heat resistance with a separation layer therebetween is transferred to the organic EL element 450 with the use of the adhesive layer 407. After that, the insulating layer 424b having an excellent barrier property and the roll sheet-shaped flexible substrate 420b are bonded to each other with the use of the adhesive layer 422b. A method for connecting the conductive layer 457 and the FPC 495 is similar to that for Structural Example 4.

When the insulating layer 424b having an excellent barrier property is directly formed on the organic EL element 450 at high temperature, the organic EL element 450 might be damaged by heat, leading to a decrease in reliability of the light-emitting device. In the case where the insulating layer 424b having an excellent barrier property formed over the formation substrate is bonded to the organic EL element 450 with the use of the adhesive layer 422b in the above-described manner, the insulating layer 424b having an excellent barrier property can be formed regardless of the heat resistance of the organic EL element 450. This allows high-yield manufacture of the highly reliable light-emitting device where the organic EL element 450 is sealed by the pair of barrier layers.

<Structural Example 6 of Light-Emitting Panel>

Figure 12A:
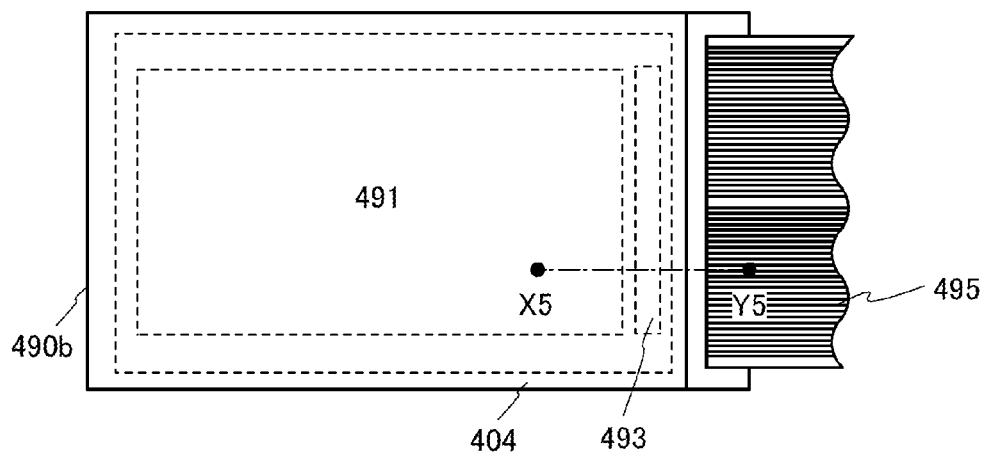
FIGS. 12A and 12B illustrate an example of a light-emitting panel.
Figure 12B:
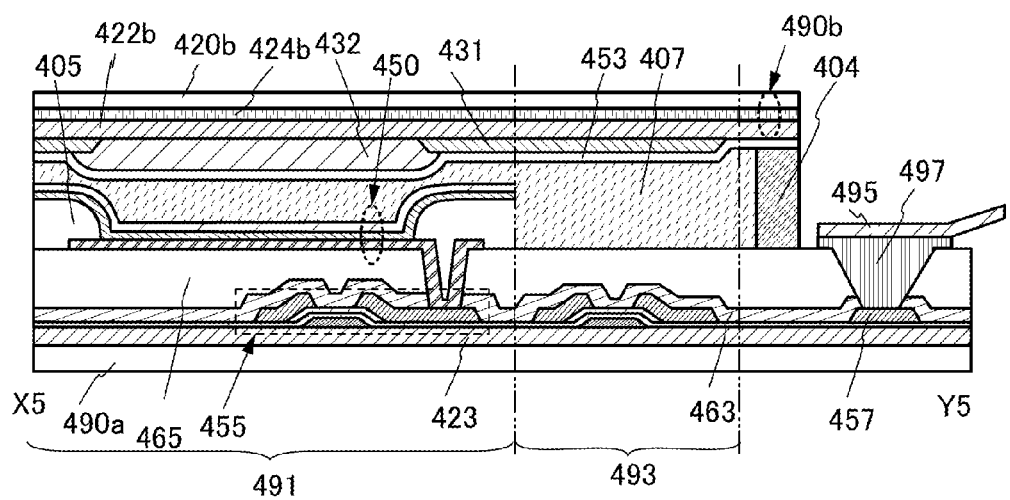

FIG. 12A is a plan view of a light-emitting panel, and FIG. 12B is a cross-sectional view along dashed-dotted line X5-Y5 in FIG. 12A. The light-emitting panel illustrated in FIG. 12B is a top-emission light-emitting panel fabricated using a color filter method. Note that the descriptions of the portions similar to those of Structural Examples 4 and 5 are omitted.

The light-emitting panel illustrated in FIG. 12A includes the light-emitting portion 491, the driver circuit portion 493, and the FPC 495. An organic EL element and transistors included in the light-emitting portion 491 and the driver circuit portion 493 are sealed with the barrier layers 490a and 490b, an adhesive layer 404, and the adhesive layer 407.

In the light-emitting panel of Structural Example 6, two kinds of bonding layers are provided between the organic EL element and each of a pair of substrates. Specifically, a bonding layer is covered with another bonding layer having a more excellent barrier property than the bonding layer. The use of a material having a more excellent barrier property than the inside bonding layer for the outside bonding layer enables suppression of entry of moisture or oxygen into the light-emitting panel from the outside, even when a material having a poor gas barrier property whose volume shrinkage in curing is small and that has high light transmittance (in particular, visible light transmittance) or high refractive index is used for the inside bonding layer. Thus, the highly reliable light-emitting panel in which shrinkage of the light-emitting portion is suppressed can be manufactured.

The light-emitting panel illustrated in FIG. 12B includes the barrier layer 490a, the base film 423, the transistor 455, the insulating layer 463, the insulating layer 465, the insulating layer 405, the organic EL element 450, the adhesive layer 407, the adhesive layer 404, an overcoat 453, a light-blocking layer 431, the coloring layer 432, the barrier layer 490b, and the conductive layer 457. The barrier layer 490b, the adhesive layer 407, and the second electrode 403 transmit visible light.

In Structural Example 6, the barrier layer 490a is formed of a flexible substrate having an excellent barrier property, and the barrier layer 490b is formed of the flexible substrate 420b, the adhesive layer 422b, and the insulating layer 424b having an excellent barrier property.

In the light-emitting portion 491 of the light-emitting panel illustrated in FIG. 12B, the transistor 455 and the organic EL element 450 are provided over the barrier layer 490a. Moreover, the light-emitting panel includes the coloring layer 432 overlapping with the organic EL element 450 with the adhesive layer 407 therebetween, and the light-blocking layer 431 overlapping with the insulating layer 405 with the adhesive layer 407 therebetween.

The driver circuit portion 493 includes a plurality of transistors. FIG. 12B illustrates one of the transistors in the driver circuit portion 493.

The conductive layer 457 is electrically connected to an external input terminal through which a signal or a potential from the outside is transmitted to the driver circuit portion 493. Here, an example in which the FPC 495 is provided as the external input terminal is described.

An example of a manufacturing method of the light-emitting panel of Structural Example 6 will be described below. The light-emitting panel of Structural Example 6 can be manufactured using the stack manufacturing apparatus that includes a formation unit of an organic EL element.

For example, first, a plurality of transistors and the organic EL element 450 are directly formed on the roll sheet-shaped barrier layer 490a. Then, the insulating layer 424b having an excellent barrier property, the coloring layer 432, the light-blocking layer 431, and the overcoat 453 are formed as layers to be separated, over a formation substrate having high heat resistance with a separation layer therebetween. Then, the layers to be separated are transferred to the organic EL element 450 with the use of the adhesive layer 407 and the adhesive layer 404. After that, the insulating layer 424b having an excellent barrier property and the roll sheet-shaped flexible substrate 420b are bonded to each other with the use of the adhesive layer 422b. A method for connecting the conductive layer 457 and the FPC 495 is similar to that for Structural Example 4.

<Modification Example of Light-Emitting Panel>

Figure 13A:
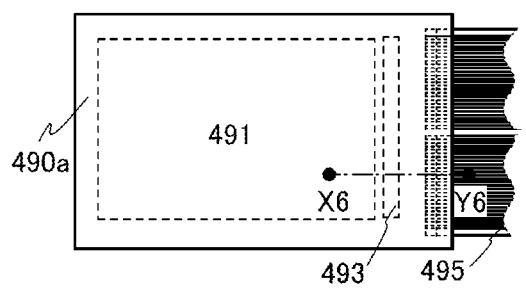
FIGS. 13A to 13C illustrate examples of light-emitting panels.
Figure 13B:
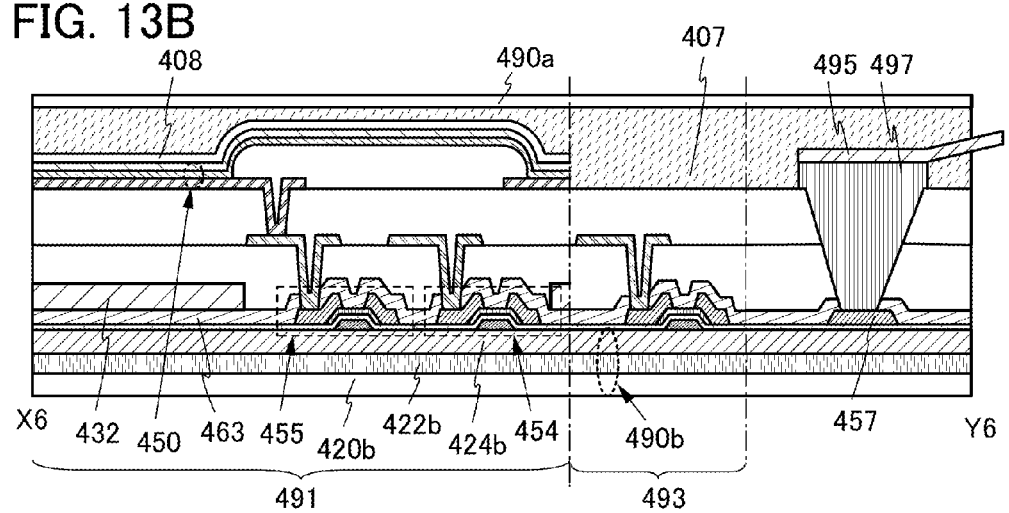
Figure 13C:
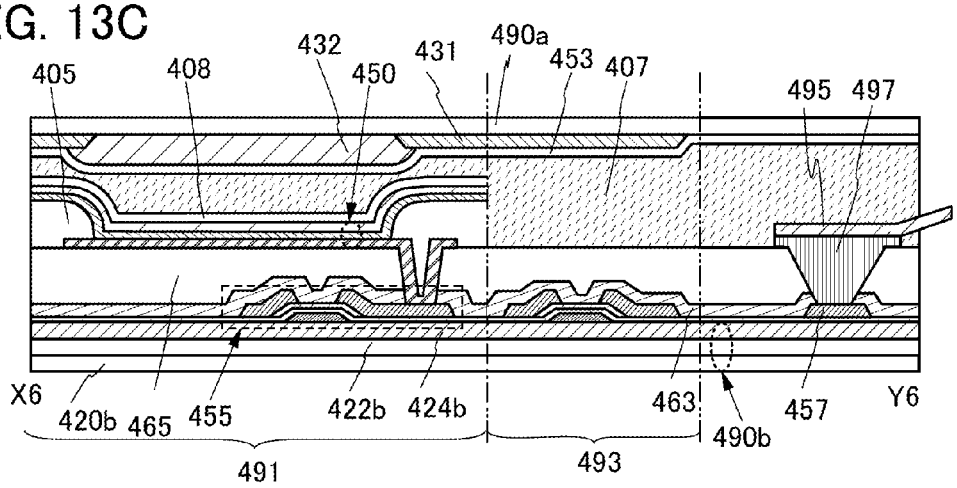

FIG. 13A is a plan view of a light-emitting panel, and FIGS. 13B and 13C are cross-sectional views along dashed-dotted line X6-Y6 in FIG. 13A. The light-emitting panel illustrated in FIG. 13B is a bottom-emission light-emitting panel fabricated using a color filter method, and the light-emitting panel illustrated in FIG. 13C is a top-emission light-emitting panel fabricated using a color filter method.

The light-emitting panel illustrated in FIGS. 13B and 13C is different from those of Structural Examples 4 and 6 in that the insulating layer 408 is provided over the organic EL element 450 and the adhesive layer 407 and the barrier layer 490a cover a region where a connector 497 and the FPC 495 overlap with the conductive layer 457. Note that the descriptions of the portions similar to those of Structural Examples 4 and 6 are omitted.

The insulating layer 408 formed over the organic EL element 450 can inhibit deterioration of the organic EL element 450 due to entry of impurities such as moisture even when the light-emitting panel is taken out to the air atmosphere in the manufacturing process thereof and the connector 497 and the FPC 495 are provided in the air atmosphere. As the insulating layer 408, an insulating layer having an excellent barrier property is preferably used.

<Materials of Light-Emitting Panel>

Next, examples of materials that can be used for the light-emitting panel are given. In addition, examples of formation substrates and separation layers that can be used to manufacture the light-emitting panel are given.

[Formation Substrate]

As the formation substrate, a substrate having at least heat resistance enough to withstand process temperature in a manufacturing process is used. As the formation substrate, for example, a glass substrate, a quartz substrate, a sapphire substrate, a semiconductor substrate, a ceramic substrate, a metal substrate, a resin substrate, or a plastic substrate can be used.

Note that it is preferable to use a large-sized glass substrate as the formation substrate in terms of productivity. In the case where a glass substrate is used as the formation substrate, an insulating film such as a silicon oxide film, a silicon oxynitride film, a silicon nitride film, or a silicon nitride oxide film is preferably formed as a base film between the formation substrate and the separation layer, in which case contamination from the glass substrate can be prevented.

[Separation Layer]

The separation layer can be formed using an element selected from tungsten, molybdenum, titanium, tantalum, niobium, nickel, cobalt, zirconium, zinc, ruthenium, rhodium, palladium, osmium, iridium, and silicon; an alloy material containing any of the elements; a compound material containing any of the elements; or the like. The crystal structure of a layer containing silicon may be amorphous, microcrystalline, or polycrystalline. Alternatively, a metal oxide such as aluminum oxide, gallium oxide, zinc oxide, titanium dioxide, indium oxide, indium tin oxide, indium zinc oxide, or an In—Ga—Zn oxide may be used. The separation layer is preferably formed using a high-melting point metal material such as tungsten, titanium, or molybdenum, in which case the degree of freedom of the process for forming the layers to be separated can be increased.

The separation layer can be formed by, for example, a sputtering method, a plasma CVD method, a coating method (including a spin coating method, a droplet discharge method, a dispensing method, and the like), or a printing method. The thickness of the separation layer is, for example, greater than or equal to 10 nm and less than or equal to 200 nm, preferably greater than or equal to 20 nm and less than or equal to 100 nm.

In the case where the separation layer has a single-layer structure, a tungsten layer, a molybdenum layer, or a layer containing a mixture of tungsten and molybdenum is preferably formed. Alternatively, a layer containing an oxide or an oxynitride of tungsten, a layer containing an oxide or an oxynitride of molybdenum, or a layer containing an oxide or an oxynitride of a mixture of tungsten and molybdenum may be formed. Note that a mixture of tungsten and molybdenum is an alloy of tungsten and molybdenum, for example.

In the case where the separation layer is formed to have a layered structure including a layer containing tungsten and a layer containing an oxide of tungsten, the layer containing an oxide of tungsten may be formed as follows: the layer containing tungsten is formed first and an insulating film formed of an oxide is formed thereover, so that the layer containing an oxide of tungsten is formed at the interface between the tungsten layer and the insulating film. Alternatively, the layer containing an oxide of tungsten may be formed by performing thermal oxidation treatment, oxygen plasma treatment, nitrous oxide ($N_2O$) plasma treatment, treatment with a highly oxidizing solution such as ozone water, or the like on the surface of the layer containing tungsten. Plasma treatment or heat treatment may be performed in an atmosphere of oxygen, nitrogen, or nitrous oxide alone, or a mixed gas of any of these gasses and another gas. Surface condition of the separation layer is changed by the plasma treatment or heat treatment, whereby adhesion between the separation layer and the insulating layer formed later can be controlled.

[Flexible Substrate]

A flexible material is used for the flexible substrate. For example, an organic resin, glass that is thin enough to have flexibility, or the like can be used. Furthermore, a material that transmits visible light is used for a substrate of the light-emitting panel from which light emission is extracted. A metal substrate or the like may be used in the case where the flexible substrate does not have to transmit visible light.

A flexible substrate having an excellent barrier property that is made of glass, a metal, an alloy, or the like can be used alone as the barrier layer. Note that a stack including a flexible substrate having an excellent barrier property and another layer may be used as the barrier layer. A flexible substrate having a poor barrier property that is made of an organic resin or the like can be used as the barrier layer when an insulating layer having an excellent barrier property, or the like is stacked over the flexible substrate.

An organic resin, which has a specific gravity smaller than that of glass, is preferably used for the flexible substrate, in which case the light-emitting panel can be more lightweight compared with the case where glass is used.

Examples of such a material having flexibility and a light-transmitting property include polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, and a polyvinyl chloride resin. In particular, a material whose coefficient of thermal expansion is low is preferred, and for example, a polyamide imide resin, a polyimide resin, or PET can be suitably used. Alternatively, a substrate in which a fibrous body is impregnated with a resin (also referred to as prepreg) or a substrate whose coefficient of thermal expansion is reduced by mixing an organic resin with an inorganic filler may be used.

In the case where a fibrous body is contained in the material having flexibility and a light-transmitting property, a high-strength fiber of an organic compound or an inorganic compound is used as the fibrous body. A high-strength fiber is specifically a fiber with a high tensile modulus of elasticity or a fiber with a high Young's modulus. Typical examples of a high-strength fiber include a polyvinyl alcohol-based fiber, a polyester-based fiber, a polyamide-based fiber, a polyethylene-based fiber, an aramid-based fiber, a polyparaphenylene benzobisoxazole fiber, a glass fiber, and a carbon fiber. As the glass fiber, glass fiber using E glass, S glass, D glass, Q glass, or the like can be used. These fibers may be used in a state of a woven fabric or a nonwoven fabric, and a structure in which this fibrous body is impregnated with a resin and the resin is cured may be used as the flexible substrate. The structure including the fibrous body and the resin is preferably used as the flexible substrate, in which case reliability against bending or breaking due to local pressure can be increased.

To improve the light extraction efficiency, the refractive index of the material having flexibility and a light-transmitting property is preferably high. For example, a substrate obtained by dispersing an inorganic filler having a high refractive index into an organic resin can have a higher refractive index than the substrate formed of only the organic resin. In particular, an inorganic filler having a particle diameter as small as 40 nm or less is preferred, because such a filler can maintain optical transparency.

To obtain flexibility and bendability, the thickness of a metal substrate is preferably greater than or equal to 10 μm and less than or equal to 200 μm, more preferably greater than or equal to 20 μm and less than or equal to 50 μm. Since a metal substrate has a high thermal conductivity, heat generated due to light emission of a light-emitting element can be efficiently released.

There is no particular limitation on a material of the metal substrate, but it is preferable to use, for example, aluminum, copper, nickel, or a metal alloy such as an aluminum alloy or stainless steel.

The flexible substrate may have a layered structure in which a hard coat layer (such as a silicon nitride layer) by which a surface of a device is protected from damage, a layer (such as an aramid resin layer) that can disperse pressure, or the like is stacked over a layer of any of the above materials. Furthermore, to suppress a decrease in the lifetime of a functional element (in particular, the organic EL element) due to moisture and the like, an insulating film with low water permeability described later may be included.

The flexible substrate may be formed by stacking a plurality of layers. When a glass layer is used, a barrier property against water and oxygen can be improved and thus a reliable light-emitting panel can be provided.

For example, a flexible substrate in which a glass layer, an adhesive layer, and an organic resin layer are stacked from the side closer to an organic EL element can be used as the barrier layer. The thickness of the glass layer is greater than or equal to 20 μm and less than or equal to 200 μm, preferably greater than or equal to 25 μm and less than or equal to 100 μm. With such a thickness, the glass layer can have both a high barrier property against water and oxygen and a high flexibility. The thickness of the organic resin layer is greater than or equal to 10 μm and less than or equal to 200 μm, preferably greater than or equal to 20 μm and less than or equal to 50 μm. When such an organic resin layer is provided outside the glass layer, occurrence of a crack or a break in the glass layer can be inhibited and mechanical strength can be improved. With the substrate that includes such a composite material of a glass material and an organic resin, a highly reliable and flexible light-emitting panel can be provided.

[Adhesive Layer]

As the adhesive layer, any of various curable adhesives, e.g., a reactive curable adhesive, a thermosetting adhesive, an anaerobic adhesive, and a photo curable adhesive such as an ultraviolet curable adhesive can be used. Examples of such adhesives include an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin. Especially, a material with low moisture permeability, such as an epoxy resin, is preferred. Alternatively, a two-component-mixture-type resin may be used. Still alternatively, an adhesive sheet or the like may be used.

Furthermore, the resin may include a drying agent. As the drying agent, for example, a substance that adsorbs moisture by chemical adsorption, such as an oxide of an alkaline earth metal (e.g., a calcium oxide or a barium oxide), can be used. Alternatively, a substance that adsorbs moisture by physical adsorption, such as zeolite or silica gel, may be used. The drying agent is preferably included because it can prevent an impurity such as moisture from entering the functional element, thereby improving the reliability of the light-emitting panel.

In addition, mixing a filler with a high refractive index or a light scattering member into the resin can improve the efficiency of light extraction from the light-emitting element. For example, titanium oxide, barium oxide, zeolite, or zirconium can be used.

[Insulating Layer]

An insulating layer having an excellent barrier property is preferably used as each of the insulating layer 408, the insulating layer 424, and the insulating layer 463.

As the insulating layer having an excellent barrier property, a film containing nitrogen and silicon, such as a silicon nitride film or a silicon nitride oxide film, a film containing nitrogen and aluminum, such as an aluminum nitride film, or the like can be used. Alternatively, a silicon oxide film, a silicon oxynitride film, an aluminum oxide film, or the like may be used.

For example, the water vapor permeability of the insulating film having an excellent barrier property is lower than or equal to $1\times10^{-5}$ [g/m$^2$·day], preferably lower than or equal to $1\times10^{-6}$ [g/m$^2$·day], more preferably lower than or equal to $1\times10^{-7}$ [g/m$^2$·day], still more preferably lower than or equal to $1\times10^{-8}$ [g/m$^2$·day].

For example, for the insulating layer 465 and the insulating layer 467, an organic material such as a polyimide resin, an acrylic resin, a polyamide resin, a polyimide amide resin, or a benzocyclobutene-based resin can be used. Alternatively, a low-dielectric constant material (a low-k material) or the like can be used. Furthermore, the insulating layer 465 and the insulating layer 467 may be formed by stacking a plurality of insulating layers.

The insulating layer 405 is formed using an organic insulating material or an inorganic insulating material. Examples of resins include a polyimide resin, a polyamide resin, an acrylic resin, a siloxane resin, an epoxy resin, and a phenol resin. It is particularly preferable that the insulating layer 405 be formed to have an inclined side wall with continuous curvature, using a photosensitive resin material.

[Transistor]

There is no particular limitation on the structure of the transistor used in the light-emitting panel of one embodiment of the present invention. For example, a forward staggered transistor or an inverted staggered transistor may be used. Furthermore, a top-gate transistor or a bottom-gate transistor may be used. In addition, there is no particular limitation on a material used for the transistor. For example, a transistor in which silicon, germanium, or an oxide semiconductor is used in a channel formation region can be used. There is no particular limitation on the crystallinity of a semiconductor, and any of an amorphous semiconductor or a semiconductor having crystallinity (a microcrystalline semiconductor, a polycrystalline semiconductor, and a semiconductor partly including crystal regions) may be used. A semiconductor having crystallinity is preferably used, in which case deterioration of transistor characteristics can be suppressed. As silicon, amorphous silicon, single crystal silicon, polycrystalline silicon, or the like can be used. As an oxide semiconductor, an In—Ga—Zn—O-based metal oxide or the like can be used.

For stable characteristics of the transistor, a base film is preferably provided. The base film can be formed to have a single-layer structure or a layered structure using an inorganic insulating film such as a silicon oxide film, a silicon nitride film, a silicon oxynitride film, or a silicon nitride oxide film. The base film can be formed by a sputtering method, a plasma CVD method, a coating method, a printing method, or the like. Note that the base film is not necessarily provided if not necessary. The insulating layer 424 can also serve as a base film of the transistor.

[Organic EL Element]

The structure of the organic EL element used for the light-emitting panel of one embodiment of the present invention is not particularly limited.

When a voltage higher than the threshold voltage of the organic EL element is applied between a pair of electrodes, holes are injected into the EL layer 402 from the anode side and electrons are injected into the EL layer 402 from the cathode side. The injected electrons and holes are recombined in the EL layer 402 and a light-emitting substance contained in the EL layer 402 emits light.

A conductive film that transmits visible light is used for the electrode through which light is extracted in the organic EL element. A conductive film that reflects visible light is preferably used for the electrode through which light is not extracted.

A conductive film that transmits visible light can be formed using, for example, indium oxide, indium tin oxide (ITO), indium zinc oxide, zinc oxide, or zinc oxide to which gallium is added. Alternatively, a film of a metal material such as gold, silver, platinum, magnesium, nickel, tungsten, chromium, molybdenum, iron, cobalt, copper, palladium, or titanium; an alloy containing any of these metal materials; or a nitride of any of these metal materials (e.g., titanium nitride) can be formed thin so as to have a light-transmitting property. Alternatively, a stack of any of the above materials can be used as the conductive film. For example, a stacked film of ITO and an alloy of silver and magnesium is preferably used, in which case conductivity can be increased. Still alternatively, graphene or the like may be used.

For the conductive film that reflects visible light, for example, a metal material such as aluminum, gold, platinum, silver, nickel, tungsten, chromium, molybdenum, iron, cobalt, copper, or palladium or an alloy containing any of these metal materials can be used. Lanthanum, neodymium, germanium, or the like may be added to the metal material or the alloy. Alternatively, an alloy containing aluminum (an aluminum alloy) such as an alloy of aluminum and titanium, an alloy of aluminum and nickel, or an alloy of aluminum and neodymium; or an alloy containing silver such as an alloy of silver and copper, an alloy of silver, palladium, and copper, or an alloy of silver and magnesium can be used for the conductive film. An alloy containing silver and copper is preferable because of its high heat resistance. Moreover, a metal film or a metal oxide film is stacked on an aluminum alloy film, whereby oxidation of the aluminum alloy film can be inhibited. Examples of a material of the metal film or the metal oxide film include titanium and titanium oxide. Alternatively, the conductive film that transmits visible light and a film containing any of the above metal materials may be stacked. For example, a stacked film of silver and ITO or a stacked film of an alloy of silver and magnesium and ITO can be used.

Each of the electrodes may be formed by an evaporation method or a sputtering method. Alternatively, a discharging method such as an ink-jet method, a printing method such as a screen printing method, or a plating method may be used.

The EL layer 402 includes at least a light-emitting layer. In addition to the light-emitting layer, the EL layer 402 may further include one or more layers containing any of a substance with a high hole-injection property, a substance with a high hole-transport property, a hole-blocking material, a substance with a high electron-transport property, a substance with a high electron-injection property, a substance with a bipolar property (a substance with a high electron- and hole-transport property), and the like.

For the EL layer 402, either a low molecular compound or a high molecular compound can be used, and an inorganic compound may also be used. Each of the layers included in the EL layer 402 can be formed by any of the following methods: an evaporation method (including a vacuum evaporation method), a transfer method, a printing method, an ink-jet method, a coating method, and the like.

[Coloring Layer, Light-Blocking Layer, and Overcoat]

The coloring layer is a coloring layer that transmits light in a specific wavelength range. For example, a red (R) color filter for transmitting light in a red wavelength range, a green (G) color filter for transmitting light in a green wavelength range, a blue (B) color filter for transmitting light in a blue wavelength range, or the like can be used. Each coloring layer is formed in a desired position with any of various materials by a printing method, an inkjet method, an etching method using a photolithography method, or the like.

The light-blocking layer is provided between the adjacent coloring layers. The light-blocking layer blocks light emitted from an adjacent organic EL element to prevent color mixture between adjacent organic EL elements. Here, the coloring layer is provided such that its end portion overlaps with the light-blocking layer, whereby light leakage can be reduced. For the light-blocking layer, a material that can block light from the organic EL element can be used; for example, a black matrix may be formed using a resin material containing a metal material, pigment, or dye. Note that it is preferable to provide the light-blocking layer in a region other than the light-emitting portion, such as the driver circuit portion, in which case undesired leakage of guided light or the like can be suppressed.

Furthermore, an overcoat covering the coloring layer and the light-blocking layer may be provided. The overcoat can prevent an impurity and the like contained in the coloring layer from being diffused into the organic EL element. The overcoat is formed with a material that transmits light emitted from the organic EL element; for example, an inorganic insulating film such as a silicon nitride film or a silicon oxide film, an organic insulating film such as an acrylic film or a polyimide film can be used, and furthermore, a layered structure of an organic insulating film and an inorganic insulating film may be employed.

In the case where upper surfaces of the coloring layer 432 and the light-blocking layer 431 are coated with a material of the adhesive layer 407, a material that has high wettability with respect to the material of the adhesive layer 407 is preferably used as the material of the overcoat. For example, an oxide conductive film such as an ITO film or a metal film such as an Ag film that is thin enough to transmit light is preferably used as the overcoat 453.

[Conductive Layer]

For example, a conductive layer functioning as an electrode or a wiring of the transistor, an auxiliary wiring of the organic EL element, or the like can be formed to have a single-layer structure or a layered structure using any of metal materials such as molybdenum, titanium, chromium, tantalum, tungsten, aluminum, copper, neodymium, and scandium, and an alloy material containing any of these elements. The conductive layer may be formed using a conductive metal oxide. As the conductive metal oxide, indium oxide (e.g., $In_2O_3$), tin oxide (e.g., $SnO_2$), zinc oxide (ZnO), ITO, indium zinc oxide (e.g., $In_2O_3$—ZnO), or any of these metal oxide materials in which silicon oxide is contained can be used.

The thickness of the auxiliary wiring can be greater than or equal to 0.1 μm and less than or equal to 3 μm, preferably greater than or equal to 0.1 μm and less than or equal to 0.5 μm.

[Light Extraction Structure]

For the light extraction structure, a hemispherical lens, a micro lens array, a film provided with an uneven surface structure, a light diffusing film, or the like can be used. For example, a light extraction structure can be formed by attaching the lens or film to the substrate with an adhesive or the like that has a refractive index substantially equal to that of the substrate or the lens or film.

[Connector]

For the connector 497, it is possible to use a paste-like or sheet-like material that is obtained by mixing metal particles into a thermosetting resin and for which anisotropic electric conductivity is provided by thermocompression bonding. As the metal particles, particles in which two or more kinds of metals are layered, for example, nickel particles coated with gold are preferably used.

This embodiment can be freely combined with any of the other embodiments.

Embodiment 3

In this embodiment, a light-emitting device using a light-emitting panel that can be manufactured according to one embodiment of the present invention will be described with reference to FIG. 14 and FIGS. 15A to 15C.

The light-emitting device of one embodiment of the present invention includes a driver circuit that can supply a control pulse signal, a constant current power source that can supply a constant current, a switching circuit that is supplied with the constant current and the control pulse signal and can supply a constant current pulse, and a light-emitting panel that is supplied with the constant current pulse. By a control pulse signal supplied from the driver circuit, whether the light-emitting panel emits light once (also referred to as pulse light emission, flash, or the like) or intermittently emits light more than once (also referred to as blink) can be controlled.

The driver circuit includes a start switch circuit that can supply a start signal, a pulse-interval modulation circuit that can supply a pulse-interval modulation signal, and a microcomputer that is supplied with the start signal and the pulse-interval modulation signal and can supply the control pulse signal. For example, whether the light-emitting panel performs single light emission or performs intermittent light emission depends on the length of the start signal supplied to the microcomputer. The pulse-interval modulation signal supplied to the microcomputer can control the interval between intermittent light emissions.

The light-emitting device of this embodiment can be used for, for example, a security device. Specifically, with the light-emitting device, a person intermittently emits light toward an assailant when attacked. This can make the assailant flinch and hesitate to attack.

In addition, when the light-emitting device is provided in a camera or a mobile phone with a camera, the light-emitting device can function as both a flash and a security device. Note that the amount of current supplied by a constant current power source 340 may be changed depending on the purpose or the ambient brightness. Specifically, the luminance of the light-emitting device that is used as a security device may be higher than the luminance of the light-emitting device that is used as a camera flash.

In addition, when the light-emitting device is used as a warning light of, for example, a bicycle, the position of the bicycle can be recognized by other vehicles, passersby, or the like. This can prevent accidents.

For example, single light emission of the light-emitting panel allows the light-emitting device of this embodiment to be used as a camera flash. In addition, intermittent light emission of the light-emitting panel allows the light-emitting device of this embodiment to be used as a security device.

Figure 14:
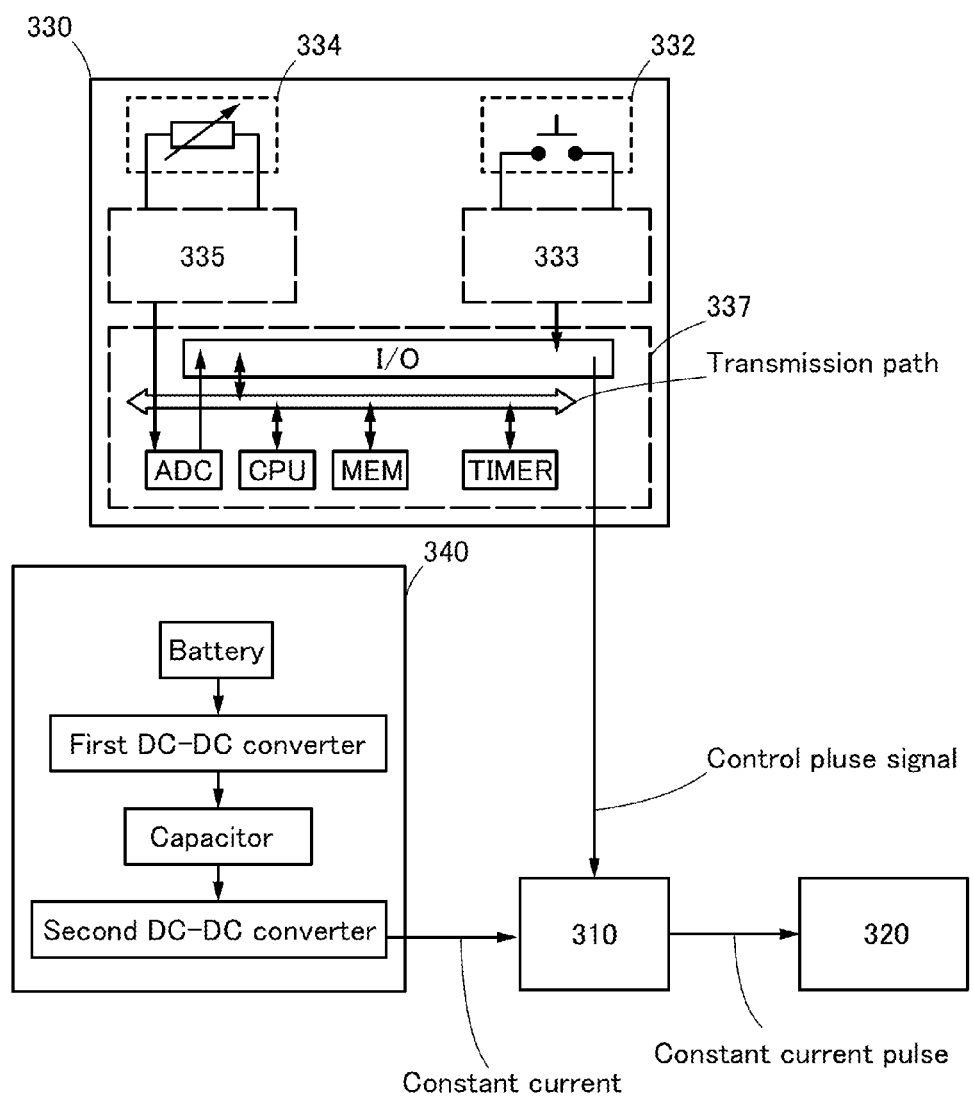
FIG. 14 illustrates an example of a light-emitting device.

FIG. 14 is a block diagram illustrating the structure of the light-emitting device.

A light-emitting device 300 includes a switching circuit 310, a light-emitting panel 320, a driver circuit 330, and the constant current power source 340.

The switching circuit 310 is supplied with a constant current and a control pulse signal and can supply a constant pulse. The driver circuit 330 can supply a control pulse signal. The constant current power source 340 can supply a control a constant current. The light-emitting panel 320 is supplied with a constant current pulse.

In this embodiment, a structure where a control pulse signal is supplied to a switching circuit is described; however, a structure where a switching circuit is not provided and a control pulse signal is supplied to a constant current power source to control the constant current power source may be employed. In this case, a constant current pulse is supplied to the light-emitting panel from the constant current power source.

The driver circuit 330 includes a start switch circuit 333 that can supply a start signal, a pulse-interval modulation circuit 335 that can supply a pulse-interval modulation signal, and a microcomputer 337 that is supplied with the start signal and the pulse-interval modulation signal and can supply a control pulse signal.

<<Switching Circuit>>

The switching circuit 310 supplies a constant current pulse to the light-emitting panel 320 while being supplied with a constant current and a control pulse signal.

The switching circuit 310 may include, for example, a power transistor. Specifically, the switching circuit 310 can be configured such that a control pulse signal is supplied to a gate of the power transistor, a constant current is supplied to a first electrode of the power transistor, and the light-emitting panel 320 is electrically connected to a second electrode of the power transistor.

<<Constant Current Power Source>>

The constant current power source 340 includes a battery that supplies a first voltage, a first DC-DC converter that is supplied with the first voltage and supplies a second voltage higher than the first voltage, a capacitor that is supplied with the second voltage, and a second DC-DC converter that is supplied with charge from the capacitor.

The first DC-DC converter boosts the voltage (the first voltage) of the battery to the second voltage and supplies the second voltage.

The capacitor is charged with the second voltage.

The second DC-DC converter is supplied with the charge stored in the capacitor and supplies a constant current.

This structure enables the second DC-DC converter to supply the constant current while the capacitor supplies the charge to the second DC-DC converter.

Note that when the amount of charge stored in the capacitor is less than a predetermined amount, the second DC-DC converter cannot supply the constant current. The constant current power source 340 can supply the constant current for a period at least longer than the width of the control pulse signal (e.g., 50 milliseconds) supplied by the driver circuit 330. When the current flows through the switching circuit 310, the charge stored in the capacitor is consumed; eventually, it becomes impossible for the constant current power source 340 to supply the constant current. As a result, a current that is not a rectangular wave flows to the light-emitting panel 320, whereby the light-emitting panel 320 emits light at an insignificant luminance lower than a predetermined luminance and wastes power. The switching circuit 310 can prevent such waste of power by stopping the current supply after the current is supplied for a predetermined period of time.

In this manner, the constant current power source 340 can supply the constant current by using the battery. Thus, the light-emitting device that can be easily carried around can be provided.

<<Driver Circuit>>

The driver circuit 330 supplies a control pulse signal with a predetermined width (half width). The predetermined width is, for example, greater than or equal to 1 millisecond and less than or equal to 1000 milliseconds, preferably greater than or equal to 10 milliseconds and less than or equal to 100 milliseconds.

The driver circuit 330 includes the start switch circuit 333, the pulse-interval modulation circuit 335, and the microcomputer 337.

The start switch circuit 333 can supply a start signal. For example, the start switch circuit 333 is provided with a start switch 332 and supplies a high or low signal as the start signal while the start switch 332 is held down.

The pulse-interval modulation circuit 335 can supply a pulse-interval modulation signal. For example, a voltage changed by a variable resistor 334 can be used as the pulse-interval modulation signal.

The microcomputer 337 is supplied with the start signal and the pulse-interval modulation signal and can supply the control pulse signal.

The microcomputer 337 includes a central processing unit CPU, a timer unit TIMER, an analog-to-digital converter ADC, an input/output unit I/O, a memory unit MEM, and a transmission path for transmitting a data signal.

The input/output unit I/O is supplied with the start signal and the pulse-interval modulation signal and can supply the control pulse signal.

The analog-to-digital converter ADC converts an analog signal into a digital signal. For example, the analog-to-digital converter ADC converts the supplied pulse-interval modulation signal into a digital signal and supplies the digital signal.

The central processing unit CPU processes the supplied data in accordance with a program stored in the memory unit MEM and supplies the processed data.

The timer unit TIMER measures a predetermined period of time in response to an instruction and supplies a signal after the predetermined period of time elapses.

The memory unit MEM stores a program to be executed by the central processing unit CPU.

For example, when the start signal is supplied for a shorter period of time than a predetermined period of time, the microcomputer 337 supplies the control pulse signal once.

When the start signal is supplied for the predetermined period of time (or a longer period of time than the predetermined period of time), the microcomputer 337 supplies the control pulse signal more than once at intervals corresponding to the pulse-interval modulation signal.

Note that in the case where the microcomputer 337 supplies the control pulse signal more than once, the microcomputer 337 may supply the control pulse signal predetermined times, may keep supplying the control pulse signal intermittently while the start signal is supplied, or may keep supplying the control pulse signal intermittently until the start signal is supplied again.

A specific example of the case where the control pulse signal is kept being supplied intermittently until the start signal is supplied again will be described below.

When the microcomputer 337 in a standby mode is supplied with a high or low start signal using the start switch 332, the microcomputer 337 supplies a rectangular wave with a predetermined width as the control pulse signal to the constant current power source 340 and measures the time when the start signal is supplied.

In the case where the start signal is supplied for a shorter period of time than a predetermined period of time, the microcomputer 337 supplies the control pulse signal once and then returns to the standby mode. Meanwhile, in the case where the start signal is supplied for the predetermined period of time (or a longer period of time than the predetermined period of time), the microcomputer 337 converts an analog pulse-interval modulation signal into a digital signal and keeps supplying the control pulse signal intermittently at predetermined pulse intervals determined by the digital signal until the start signal is supplied again.

<<Light-Emitting Panel>>

The light-emitting panel 320 includes a light-emitting element. Any of a point light source, a line light source, and a planar light source can be used for the light-emitting panel 320.

The light-emitting panel 320 includes, for example, a supporting substrate and a light-emitting element over the supporting substrate. The number of light-emitting elements may be one or more. Examples of the light-emitting element include an organic EL element.

The area of a light-emitting portion in the light-emitting panel 320 is greater than or equal to 0.5 cm$^2$ and less than or equal to 1 m$^2$, preferably greater than or equal to 5 cm$^2$ and less than or equal to 200 cm$^2$, more preferably greater than or equal to 15 cm$^2$ and less than or equal to 100 cm$^2$.

The current density of the light-emitting element that emits light in light-emitting panel 320 is, for example, greater than or equal to 10 mA/cm$^2$ and less than or equal to 2000 mA/cm$^2$.

The light-emitting panel 320 may include a plurality of light-emitting elements that exhibit different colors. When a color or color temperature of a camera flash can be changed, the reproducibility of a subject, an environment, an atmosphere, and the like when a photograph is taken can be enhanced. In addition, a light-emitting device may include a plurality of light-emitting panels that exhibit different colors.

A flexible light-emitting panel fabricated using a flexible material for a supporting substrate or the like can be placed along a housing having a curved surface. In that case, a light-emitting device can be positioned without compromising the design of a housing. For example, a flash can be positioned along a camera housing having a curved surface.

However, as the size of a camera flash decreases, the shape of its light-emitting portion becomes more linear or point-like. Light from a light source travels in a straight line; therefore, a smaller light source casts a sharper shadow of an object. Thus, when a photograph of a human face is taken in a dark place using a flash, for example, a shadow of a nose might be cast on a cheek.

In view of the above, a light-emitting element that is a planar light source is used for a light-emitting panel in one embodiment of the present invention. For example, with the use of an organic EL element, a thin and large-area element can be formed easily. When a planar light source, a point light source, and a line light source emit the same amount of light, the planar light source can have a smaller amount of light per unit area or a shorter emission time than the point light source and the line light source. Thus, the amount of heat generation per unit area can be reduced. In addition, the planar light source releases heat easily because of its large light-emitting area. Accordingly, deterioration due to local heat generation of the light-emitting panel can be suppressed. Therefore, it is possible to provide a light-emitting device that has higher reliability and causes less deterioration of a light-emitting panel than a light-emitting device including a light-emitting diode or the like using an inorganic material.

The light-emitting panel can be thinner and lighter in the case of using an organic EL element than in the conventional case of using a xenon lamp or the like. Heat generated by light emission is diffused over a large area in the light-emitting panel and is therefore released efficiently. Accordingly, heat accumulation in the light-emitting panel is suppressed, and thus, deterioration of the light-emitting panel is suppressed.

Since the light-emitting panel is a planar light source, when the light-emitting device of one embodiment of the present invention is used for a flash of a camera, a shadow is less likely to be produced on a subject for photography.

The light-emitting panel can be configured to emit white light by using a properly selected light-emitting organic compound. For example, a plurality of light-emitting organic compounds that emit light of complementary colors can be used. Alternatively, three kinds of light-emitting organic compounds that emit light of red, green, and blue can be used. Furthermore, a light-emitting device having excellent white balance can be obtained by using a plurality of organic compounds that emit light of different colors as appropriate.

By using a light-emitting organic compound, an emission spectrum can be broadened compared with a light-emitting diode using an inorganic material. Light having a broad emission spectrum is close to natural light and suitable for photography.

The light-emitting panel 320 can be manufactured using the stack manufacturing apparatus of one embodiment of the present invention.

For example, the light-emitting panel illustrated in FIGS. 15A to 15C can be used as the light-emitting panel 320.

FIG. 15A is a plan view of the light-emitting panel. FIG. 15B is a cross-sectional view along dashed-dotted line A1-B1 in FIG. 15A. FIG. 15C is a cross-sectional view along dashed-dotted line A2-B2 in FIG. 15A.

In the light-emitting panel illustrated in FIGS. 15A to 15C, a supporting substrate 1220 and the insulating layer 1224 are bonded to each other using an adhesive layer 1222. The light-emitting element 1250 is provided over the supporting substrate 1220 with the insulating layer 1224 interposed therebetween. An auxiliary wiring 1206 is provided over the insulating layer 1224 and is electrically connected to a first electrode 1201. The auxiliary wiring 1206 is partly exposed and functions as a terminal. An end portion of the first electrode 1201 and an end portion of a conductive layer 1210 are covered with a partition wall 1205. Furthermore, the partition wall 1205 is provided to cover the auxiliary wiring 1206 with the first electrode 1201 provided therebetween. The light-emitting element 1250 is sealed with the supporting substrate 1220, a sealing substrate 1228, and a sealing material 1227. A flexible light-emitting panel can be obtained by using flexible substrates as the supporting substrate 1220 and the sealing substrate 1228.

The light-emitting element 1250 is an organic EL element having a bottom-emission structure; specifically, the first electrode 1201 that transmits visible light is provided over the supporting substrate 1220, an EL layer 1202 is provided over the first electrode 1201, and a second electrode 1203 that reflects visible light is provided over the EL layer 1202.

In the light-emitting panel illustrated in FIGS. 15A to 15C, an opening is provided in a circular non-light-emitting region. The auxiliary wiring 1206 and the first electrode 1201 are not provided in the non-light-emitting region. The non-light-emitting region includes neither the auxiliary wiring 1206 nor the first electrode 1201. This structure can prevent the first electrode 1201 of the light-emitting element 1250 or the auxiliary wiring 1206 from being in contact with the second electrode 1203 and being short-circuited when an opening is formed.

For example, the opening can be formed in part of the light-emitting panel with laser light having a wavelength in the UV region (i.e., UV laser light). The opening can be formed with a punch or the like instead of laser light, in which case peeling of a film, especially the EL layer 1202 or the like, might occur because of pressure applied to the light-emitting panel. Laser light is preferably used to form the opening, in which case peeling of a film can be prevented and a highly reliable light-emitting panel can be fabricated.

As illustrated in FIG. 15B, the light-emitting panel preferably includes a sealant 1226 in the opening to prevent an electrode or an EL layer from being exposed. Specifically, an opening is formed in the light-emitting panel, and then the sealant 1226 is formed to cover at least an exposed electrode and an exposed EL layer. The sealant 1226 may be the same material as or a different material from the sealant 1227.

Although FIG. 15B illustrates an example of an opening formed in a region where the partition wall 1205 is not provided, an opening may be formed in a region where the partition wall 1205 is provided.

The light-emitting panel is manufactured in the above manner, and a camera lens is provided to overlap with the opening, whereby the light-emitting portion can be provided around the camera lens. The light-emitting portion can be used as a camera flash.

Note that a light extraction structure may be provided on a surface of the substrate.

As described above, one embodiment of the present invention can provide a light-emitting device that can emit light once or intermittently emit light more than once.

This embodiment can be freely combined with any of the other embodiments.

Embodiment 4

In this embodiment, examples of electronic devices and lighting devices that can be manufactured according to one embodiment of the present invention will be described with reference to FIGS. 16A to 16G and FIGS. 17A to 17E.

A highly reliable light-emitting panel that can be used as an electronic device or a lighting device can be manufactured with a high yield by using a manufacturing apparatus of a light-emitting panel of one embodiment or a manufacturing method of a light-emitting panel of one embodiment of the present invention.

Examples of electronic devices include a television set (also referred to as a television or a television receiver), a monitor of a computer or the like, a digital camera, a digital video camera, a digital photo frame, a mobile phone (also referred to as a mobile phone device), a portable game machine, a portable information terminal, an audio reproducing device, a large game machine such as a pinball machine, and the like.

The light-emitting panel manufactured according to one embodiment of the present invention has flexibility and thus can be incorporated along a curved inside or outside wall surface of a house or a building or a curved interior or exterior surface of a car.

Figure 16A:
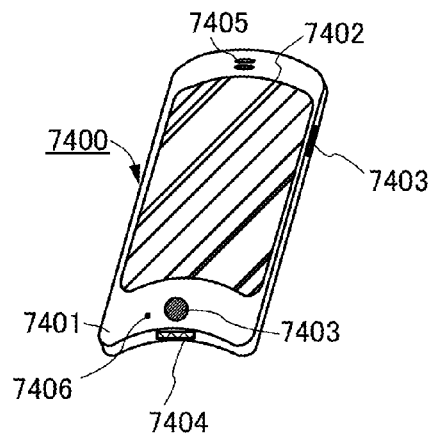
FIGS. 16A to 16G illustrate examples of electronic devices and lighting devices.

FIG. 16A illustrates an example of a mobile phone. The mobile phone 7400 is provided with a display portion 7402 incorporated in a housing 7401, operation buttons 7403, an external connection port 7404, a speaker 7405, a microphone 7406, and the like. Note that the mobile phone 7400 is manufactured using the light-emitting panel manufactured according to one embodiment of the present invention for the display portion 7402. According to one embodiment of the present invention, a highly reliable mobile phone having a curved display portion can be provided with a high yield.

When the display portion 7402 of the mobile phone 7400 in FIG. 16A is touched with a finger or the like, data can be input into the mobile phone 7400. Furthermore, operations such as making a call and inputting text can be performed by touch on the display portion 7402 with a finger or the like.

With the operation buttons 7403, the power can be turned on or off. In addition, the types of images displayed on the display portion 7402 can be switched; for example, switching images from a mail creation screen to a main menu screen can be performed.

Figure 16B:
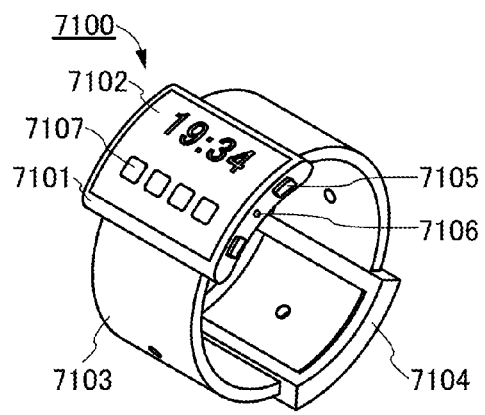

FIG. 16B illustrates an example of a wrist-watch-type portable information terminal A portable information terminal 7100 includes a housing 7101, a display portion 7102, a band 7103, a buckle 7104, an operation button 7105, an input/output terminal 7106, and the like.

The portable information terminal 7100 is capable of executing a variety of applications such as mobile phone calls, e-mailing, reading and editing texts, music reproduction, Internet communication, and a computer game.

The display surface of the display portion 7102 is bent, and images can be displayed on the bent display surface. Furthermore, the display portion 7102 includes a touch sensor, and operation can be performed by touching the screen with a finger, a stylus, or the like. For example, by touching an icon 7107 displayed on the display portion 7102, an application can be started.

With the operation button 7105, a variety of functions such as power ON/OFF, ON/OFF of wireless communication, setting and cancellation of manner mode, and setting and cancellation of power saving mode can be performed. For example, the functions of the operation button 7105 can be set freely by setting the operation system incorporated in the portable information terminal 7100.

The portable information terminal 7100 can employ near field communication that is a communication method based on an existing communication standard. In that case, for example, mutual communication between the portable information terminal 7100 and a headset capable of wireless communication can be performed, and thus hands-free calling is possible.

Moreover, the portable information terminal 7100 includes the input/output terminal 7106, and data can be directly transmitted to and received from another information terminal via a connector. Charging through the input/output terminal 7106 is possible. Note that the charging operation may be performed by wireless power feeding without using the input/output terminal 7106.

The display portion 7102 of the portable information terminal 7100 includes a light-emitting panel manufactured by using one embodiment of the present invention. According to one embodiment of the present invention, a highly reliable portable information terminal having a curved display portion can be provided with a high yield.

Figure 16C:
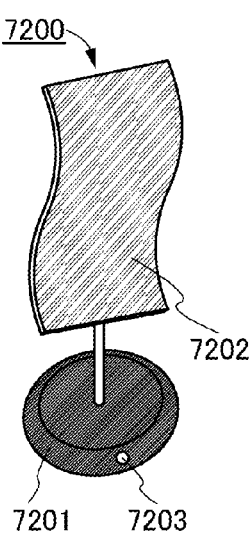
Figure 16D:
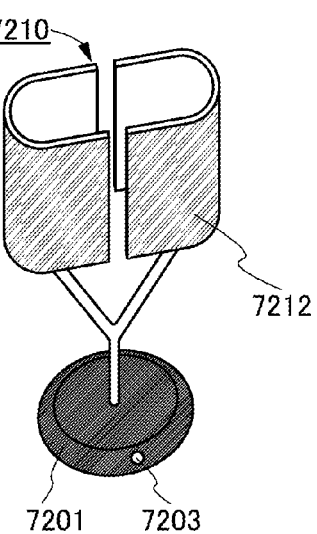
Figure 16E:
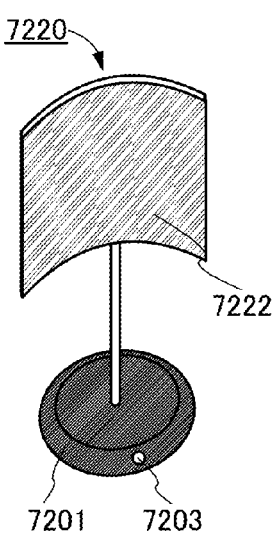

FIGS. 16C to 16E illustrate examples of lighting devices. Lighting devices 7200, 7210, and 7220 each include a stage 7201 provided with an operation switch 7203 and a light-emitting portion supported by the stage 7201.

The lighting device 7200 illustrated in FIG. 16C includes a light-emitting portion 7202 with a wave-shaped light-emitting surface and thus is a good-design lighting device.

A light-emitting portion 7212 included in the lighting device 7210 illustrated in FIG. 16D has two convex-curved light-emitting portions symmetrically placed. Thus, all directions can be illuminated with the lighting device 7210 as a center.

The lighting device 7220 illustrated in FIG. 16E includes a concave-curved light-emitting portion 7222. This is suitable for illuminating a specific range because light emitted from the light-emitting portion 7222 is collected to the front of the lighting device 7220.

The light-emitting portion included in each of the lighting devices 7200, 7210, and 7220 is flexible; thus, the light-emitting portion may be fixed on a plastic member, a movable frame, or the like so that an emission surface of the light-emitting portion can be bent freely depending on the intended use.

Note that although the lighting device in which the light-emitting portion is supported by the stage is described as an example here, a housing provided with a light-emitting portion can be fixed on a ceiling or suspended from a ceiling. Since the light-emitting surface can be bent, the light-emitting surface is bent to have a depressed shape, whereby a particular region can be illuminated, or the light-emitting surface is bent to have a projecting shape, whereby a whole room can be illuminated.

Here, each light-emitting portion includes the light-emitting panel manufactured according to one embodiment of the present invention. According to one embodiment of the present invention, a highly reliable lighting device having a curved display portion can be provided at a high yield.

Figure 16F:
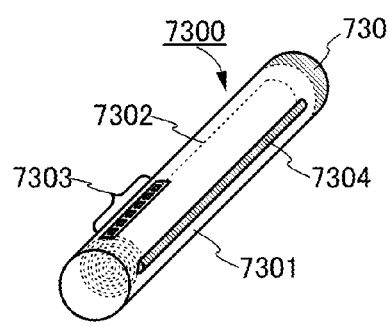

FIG. 16F illustrates an example of a portable display device. A display device 7300 includes a housing 7301, a display portion 7302, operation buttons 7303, a display portion pull 7304, and a control portion 7305.

The display device 7300 includes a rolled flexible display portion 7302 in the cylindrical housing 7301.

The display device 7300 can receive a video signal with the control portion 7305 and can display the received video on the display portion 7302. In addition, a battery is included in the control portion 7305. Moreover, a terminal portion for connecting a connector may be included in the control portion 7305 so that a video signal or power can be directly supplied from the outside with a wiring.

By pressing the operation buttons 7303, power ON/OFF, switching of displayed videos, and the like can be performed.

Figure 16G:
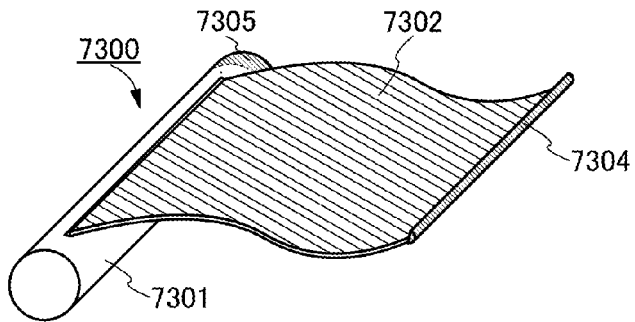

FIG. 16G illustrates the display device 7300 in a state where the display portion 7302 is pulled out with the display portion pull 7304. Videos can be displayed on the display portion 7302 in this state. Furthermore, the operation buttons 7303 on the surface of the housing 7301 allow one-handed operation. The operation buttons 7303 are provided not in the center of the housing 7301 but on one side of the housing 7301 as illustrated in FIG. 16F, which makes one-handed operation easy.

Note that a reinforcement frame may be provided for a side portion of the display portion 7302 so that the display portion 7302 has a flat display surface when pulled out.

Note that in addition to this structure, a speaker may be provided for the housing so that sound is output with an audio signal received together with a video signal.

The display portion 7302 includes the light-emitting panel manufactured according to one embodiment of the present invention. According to one embodiment of the present invention, a lightweight and highly reliable display device can be provided with a high yield.

The light-emitting device described in Embodiment 3 can be used for a flash of a camera such as a digital still camera, a flash of a camera incorporated in a mobile phone or a portable information terminal having a photography function, a security device, or the like. Alternatively, the light-emitting device of one embodiment of the present invention can be used for a light of a bicycle or a car, a beacon, illuminations for decorative purposes, or the like. According to one embodiment of the present invention, a lightweight and highly reliable light-emitting device can be provided at a high yield.

Figure 17A:
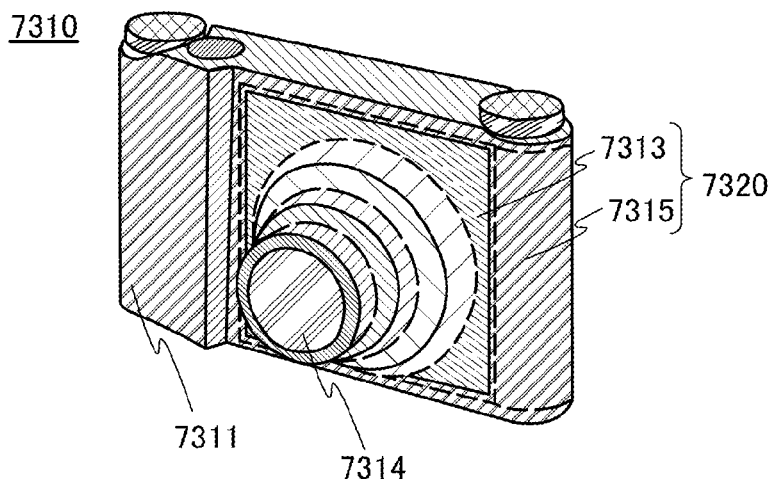
FIGS. 17A to 17E illustrate examples of electronic devices.

FIG. 17A illustrates an example of a digital still camera. A digital still camera 7310 includes a housing 7311, a lens 7314, a light-emitting device 7320, and the like. The light-emitting device described in Embodiment 3 is used as the light-emitting device 7320. A light-emitting portion 7313 of the light-emitting device 7320 is located so as to surround the lens 7314. The light-emitting device manufactured according to one embodiment of the present invention is flexible and can thus be bent. In the digital still camera 7310, a non-light-emitting portion 7315 is bent to fit the shape of the housing 7311, which enables the light-emitting portion 7313 to be located over a large area around the lens 7314. This can make a shadow of a nose less likely to be cast on a cheek when a photograph of a human face is taken in a dark place using a flash, for example. Note that a light-emitting element may be formed in the non-light-emitting portion 7315 through the same process and may be used as an indicator of operating conditions.

Figure 17B:
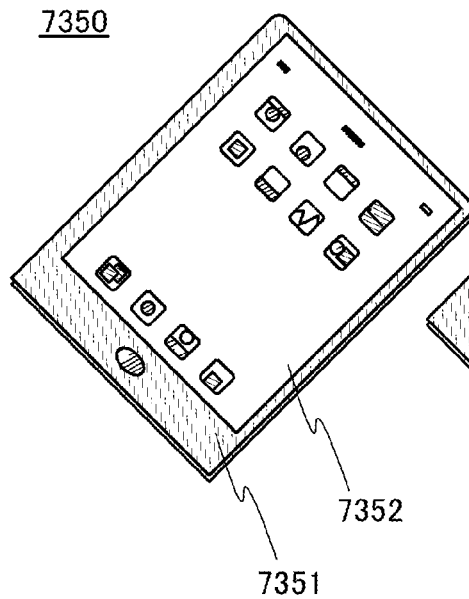
Figure 17C:
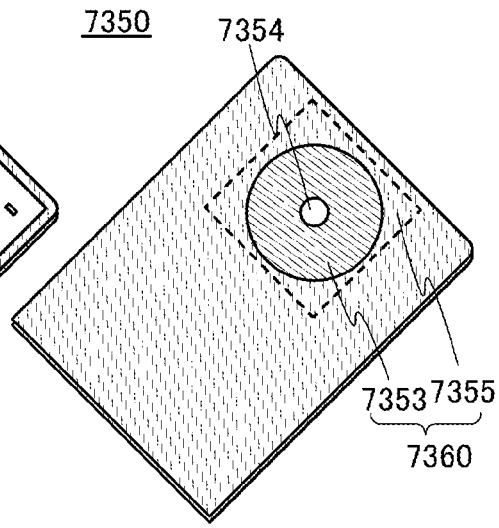

FIGS. 17B and 17C illustrate an example of a portable information terminal. One side (also referred to as a front side) of a portable information terminal 7350 is illustrated in FIG. 17B, and a side opposite to the one side (also referred to as a back side) is illustrated in FIG. 17C.

The portable information terminal 7350 includes a housing 7351, a display portion 7352, a lens 7354, a light-emitting device 7360, and the like. The light-emitting device described in Embodiment 3 is used as the light-emitting device 7360. The light-emitting device 7360 includes a light-emitting portion 7353 and a non-light-emitting portion 7355, and the light-emitting portion 7353 is located so as to surround the lens 7354. The light-emitting portion 7353 may be used as a mirror when not emitting light.

Figure 17D:
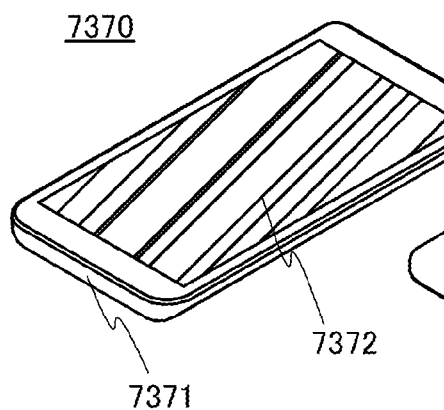
Figure 17E:
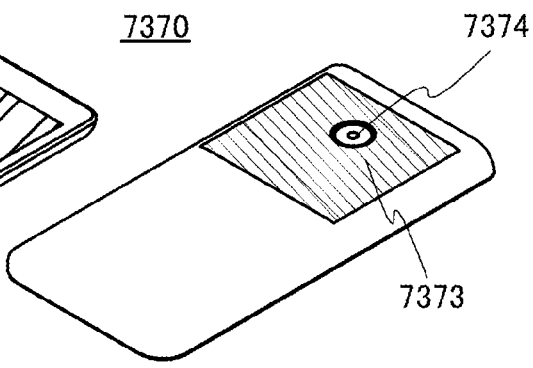

FIGS. 17D and 17E illustrate an example of a mobile phone. One side (also referred to as a front side) of a mobile phone 7370 is illustrated in FIG. 17D, and a side opposite to the one side (also referred to as a back side) is illustrated in FIG. 17E.

The mobile phone 7370 includes a housing 7371, a display portion 7372, a lens 7374, a light-emitting device 7373, and the like. The light-emitting device 7373 described in Embodiment 3 is used as the light-emitting device 7373. The lens 7354 is provided in an opening portion of the light-emitting device 7373.

This embodiment can be freely combined with any of the other embodiments.

This application is based on Japanese Patent Application serial no. 2013-193314 filed with Japan Patent Office on Sep. 18, 2013, the entire contents of which are hereby incorporated by reference.

What is claimed is:

1. An apparatus for manufacturing a stack comprising:
a first supporting body supply unit including a first tension applying device, the first supporting body supply unit configured to intermittently unroll a first supporting body;
a first adhesive layer formation unit configured to form a first adhesive layer over the first supporting body while unrolling of the first supporting body is stopped;
a first bonding unit including a holding mechanism configured to hold a sheet-shaped member, the first bonding unit configured to bond the sheet-shaped member and the first supporting body using the first adhesive layer so that a first stack where the first supporting body, the first adhesive layer, and the sheet-shaped member are stacked in this order is formed while unrolling of the first supporting body is stopped;

a first movable stage comprised in the first bonding unit;
a second movable stage comprised in the first adhesive layer formation unit; and
a control unit including a second tension applying device, the control unit configured to hold an end portion of the first supporting body,
wherein the first movable stage is configured to move in each of forward, backward, right, left, up and down directions,
wherein the second movable stage is configured to move in each of forward, backward, right, left, up and down directions,
wherein the first tension applying device and the second tension applying device are configured to apply tension to the first supporting body, and
wherein the holding mechanism is provided with a heater and is configured to cure the first adhesive layer.

2. The apparatus according to claim 1, further comprising a dividing unit,
wherein the apparatus is configured to supply the first stack to the dividing unit, and
wherein the dividing unit is configured to divide the first supporting body while unrolling of the first supporting body is stopped.

3. The apparatus according to claim 2, wherein the dividing unit is configured to divide the first supporting body in a region where the first adhesive layer is not provided.

4. The apparatus according to claim 1, further comprising a rolling-up unit,
wherein the apparatus is configured to supply the first stack to the rolling-up unit, and
wherein the rolling-up unit is configured to intermittently roll up the first stack.

5. The apparatus according to claim 1,
wherein the first bonding unit includes a chamber, and
wherein an atmosphere in the chamber is set to a reduced-pressure atmosphere while unrolling of the first supporting body is stopped.

6. The apparatus according to claim 1, further comprising a chamber including the first supporting body supply unit, the first adhesive layer formation unit, and the first bonding unit,
wherein the chamber is provided with a gas supply mechanism and an exhaust mechanism.

7. The apparatus according to claim 1,
wherein the first adhesive layer formation unit includes a chamber,
wherein an atmosphere in the chamber is set to a reduced-pressure atmosphere while unrolling of the first supporting body is stopped.

8. The apparatus according to claim 1, wherein the first supporting body is a film formed using an organic resin, a metal, an alloy, or glass.

9. An apparatus for manufacturing a stack comprising:
a first supporting body supply unit including a first tension applying device, the first supporting body supply unit configured to intermittently unroll a first supporting body;
a first adhesive layer formation unit configured to form a first adhesive layer over the first supporting body while unrolling of the first supporting body is stopped;
a first bonding unit including a holding mechanism configured to hold a sheet-shaped member, the first bonding unit configured to bond the sheet-shaped member and the first supporting body using the first adhesive layer so that a first stack where the first supporting body, the first adhesive layer, and the sheet-shaped member are stacked in this order is formed while unrolling of the first supporting body is stopped;
a trigger formation unit configured to form a separation trigger in vicinities of end portions of the first adhesive layer and the sheet-shaped member while unrolling of the first supporting body is stopped;
a separating unit configured to separate the first stack into an outer layer and a remaining portion using the separation trigger while unrolling of the first supporting body is stopped;
a second adhesive layer formation unit configured to form a second adhesive layer over the remaining portion while unrolling of the first supporting body is stopped;
a second bonding unit configured to be supplied with a second supporting body that is a sheet shape, the second bonding unit configured to bond the second supporting body and the remaining portion using the second adhesive layer so that a second stack where the remaining portion, the second adhesive layer, and the second supporting body are stacked in this order is formed while unrolling of the first supporting body is stopped; and
a control unit including a second tension applying device, the control unit configured to hold an end portion of the first supporting body,
wherein the first tension applying device and the second tension applying device are configured to apply tension to the first supporting body.

10. The apparatus according to claim 9,
wherein the first supporting body supply unit includes a roller configured to intermittently unroll the first supporting body, and
wherein the second bonding unit includes a roller configured to intermittently unroll the second supporting body.

11. The apparatus according to claim 9, further comprising a dividing unit,
wherein the apparatus is configured to supply the second stack to the dividing unit, and
wherein the dividing unit is configured to divide the first supporting body and the second supporting body while unrolling of the first supporting body is stopped.

12. The apparatus according to claim 11, wherein the dividing unit is configured to divide the first supporting body in a region where the first adhesive layer is not provided.

13. The apparatus according to claim 9, further comprising a rolling-up unit,
wherein the apparatus is configured to supply the second stack to the rolling-up unit, and
wherein the rolling-up unit is configured to intermittently roll up the second stack.

14. The apparatus according to claim 9, further comprising a first adhesive layer curing unit,
wherein the apparatus is configured to supply the first stack to the first adhesive layer curing unit, and
wherein the first adhesive layer curing unit is configured to cure the first adhesive layer.

15. The apparatus according to claim 9, further comprising a second adhesive layer curing unit,
wherein the apparatus is configured to supply the second stack to the second adhesive layer curing unit, and
wherein the second adhesive layer curing unit is configured to cure the second adhesive layer.

16. The apparatus according to claim 9,
wherein the first bonding unit includes a chamber,
wherein an atmosphere in the chamber is set to a reduced-pressure atmosphere while unrolling of the first supporting body is stopped.

17. The apparatus according to claim 9, further comprising a chamber including the first supporting body supply unit, the first adhesive layer formation unit, the first bonding unit, the trigger formation unit, the separating unit, the second adhesive layer formation unit, and the second bonding unit,
wherein the chamber is provided with a gas supply mechanism and an exhaust mechanism.

18. The apparatus according to claim 9,
wherein the first adhesive layer formation unit includes a chamber,
wherein an atmosphere in the chamber is set to a reduced-pressure atmosphere while unrolling of the first supporting body is stopped.

19. The apparatus according to claim 9, wherein the first supporting body is a film formed using an organic resin, a metal, an alloy, or glass.

20. An apparatus for manufacturing a stack comprising:
a first supporting body supply unit including a first tension applying device, the first supporting body supply unit configured to intermittently unroll a first supporting body;
a first adhesive layer formation unit configured to form a first adhesive layer over the first supporting body while unrolling of the first supporting body is stopped;
a first bonding unit including a holding mechanism configured to hold a sheet-shaped member, the first bonding unit configured to bond the sheet-shaped member and the first supporting body using the first adhesive layer so that a first stack where the first supporting body, the first adhesive layer, and the sheet-shaped member are stacked in this order is formed while unrolling of the first supporting body is stopped,
a first movable stage comprised in the first bonding unit;
a second movable stage comprised in the first adhesive layer formation unit;
a control unit including a second tension applying device, the control unit configured to hold an end portion of the first supporting body, and
a first adhesive layer curing unit;
wherein the first movable stage is configured to move in each of forward, backward, right, left, up and down directions,
wherein the second movable stage is configured to move in each of forward, backward, right, left, up and down directions,
wherein the first tension applying device and the second tension applying device are configured to apply tension to the first supporting body,
wherein the first adhesive layer is a photo-curable adhesive,
wherein the apparatus is configured to supply the first stack to the first adhesive layer curing unit, and
wherein the first adhesive layer curing unit is supplied with a light-irradiation mechanism configured to cure the first adhesive layer.

21. The apparatus according to claim 20,
wherein the light-irradiation mechanism comprises a laser or a lamp.

22. The apparatus according to claim 20,
wherein the first bonding unit includes a chamber, and
wherein an atmosphere in the chamber is set to a reduced-pressure atmosphere while unrolling of the first supporting body is stopped.

23. The apparatus according to claim 20, further comprising a chamber including the first supporting body supply unit, the first adhesive layer formation unit, and the first bonding unit,
wherein the chamber is provided with a gas supply mechanism and an exhaust mechanism.

24. The apparatus according to claim 20,
wherein the first adhesive layer formation unit includes a chamber,
wherein an atmosphere in the chamber is set to a reduced-pressure atmosphere while unrolling of the first supporting body is stopped.

25. The apparatus according to claim 20, wherein the first supporting body is a film formed using an organic resin, a metal, an alloy, or glass.

* * * * *